US006633898B1

(12) United States Patent
Seguchi et al.

(10) Patent No.: US 6,633,898 B1
(45) Date of Patent: Oct. 14, 2003

(54) SYSTEM, APPARATUS, METHOD AND COMPUTER PROGRAM PRODUCT FOR PROCESSING DISTRIBUTED SERVICE MODULES

(75) Inventors: Yoshiyuki Seguchi, Fukuoka (JP); Hiroyuki Yamashima, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/361,971

(22) Filed: Jul. 28, 1999

(30) Foreign Application Priority Data

Dec. 8, 1998 (JP) .......................................... 10-349067

(51) Int. Cl.[7] .............................................. G06F 15/16
(52) U.S. Cl. ...................... 709/201; 709/102; 709/104; 709/105; 709/220; 709/222
(58) Field of Search ............................... 709/220, 222, 709/102, 104, 105, 201

(56) References Cited

U.S. PATENT DOCUMENTS

| 5,752,042 A | * 5/1998 | Cole et al. ................... 717/173 |
| 5,838,916 A | * 11/1998 | Domenikos et al. ......... 709/219 |
| 5,974,454 A | * 10/1999 | Apfel et al. ................. 709/221 |
| 5,993,038 A | * 11/1999 | Sitbon et al. ................ 709/202 |
| 6,134,588 A | * 10/2000 | Guenthner et al. .......... 709/226 |
| 6,138,159 A | * 10/2000 | Phaal ........................... 709/226 |
| 6,175,869 B1 | * 1/2001 | Ahuja et al. ................. 709/226 |
| 6,195,678 B1 | * 2/2001 | Komuro ...................... 709/202 |
| 6,314,447 B1 | * 11/2001 | Lea et al. .................... 709/105 |
| 6,324,580 B1 | * 11/2001 | Jindal et al. ................. 709/228 |
| 6,351,775 B1 | * 2/2002 | Yu .............................. 709/238 |
| 6,385,636 B1 | * 5/2002 | Suzuki ........................ 709/105 |
| 6,397,252 B1 | * 5/2002 | Sadiq .......................... 709/226 |

FOREIGN PATENT DOCUMENTS

JP     HEI 10-21081     1/1998

* cited by examiner

*Primary Examiner*—Saleh Najjar
(74) *Attorney, Agent, or Firm*—Staas & Halsey LLP

(57) ABSTRACT

A service program for execution of a service is divided into a server control module for execution of the service in a server, a display control module for providing a display control in a client, an initial setting module defining a method of acquiring a service module prepared based on the type of client and required for the client, and a common module operable in the operating environment of the server and the client both. When a shortage of resources is detected in the client during execution of this service program then a portion of the common modules is executed in the server, and when a shortage of resources is detected in the server then a portion of the common modules is executed in some other server.

12 Claims, 23 Drawing Sheets

FIG.16
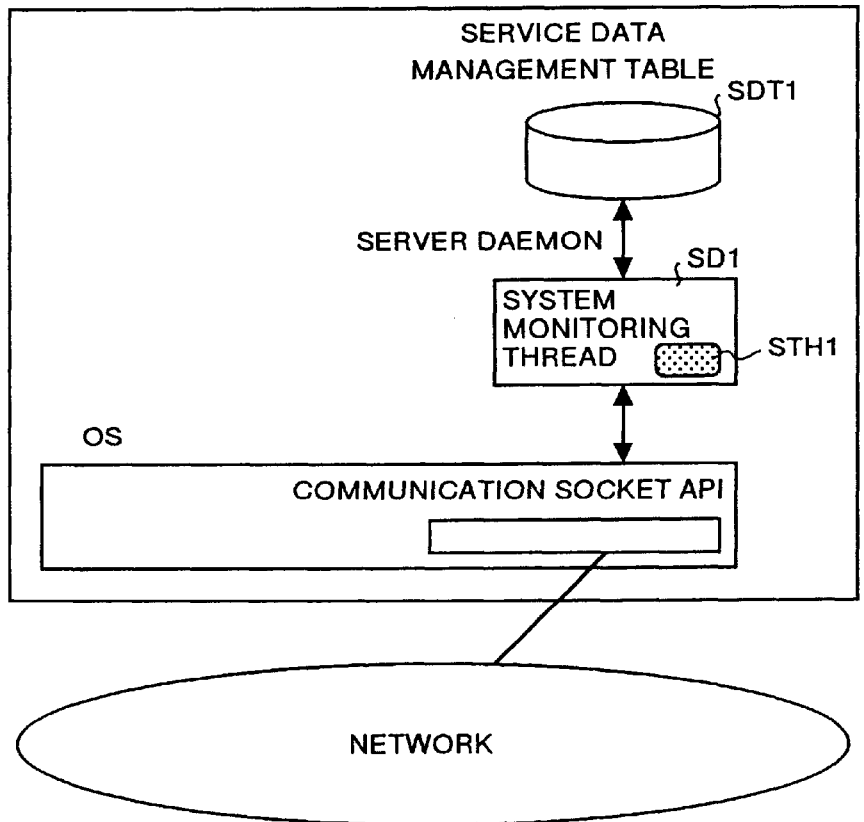
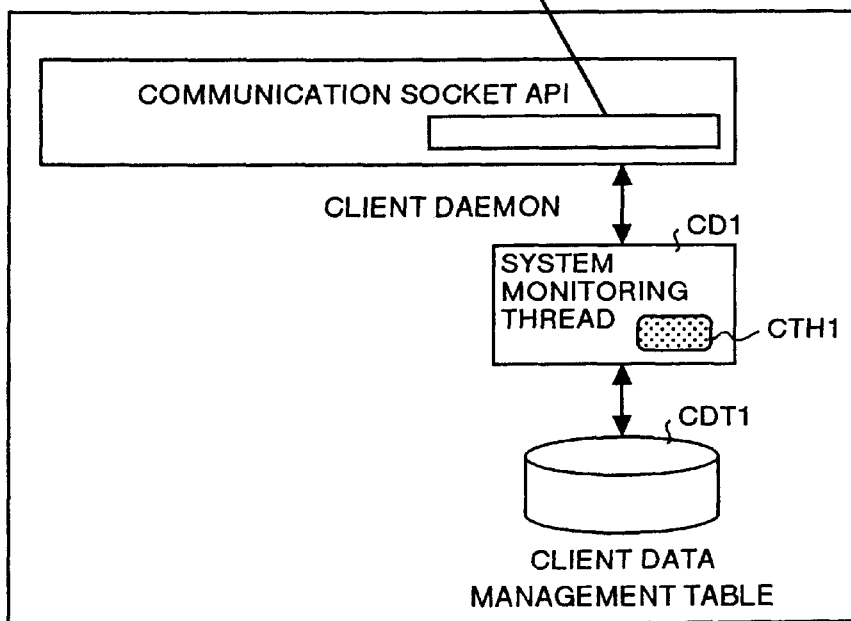

FIG.18
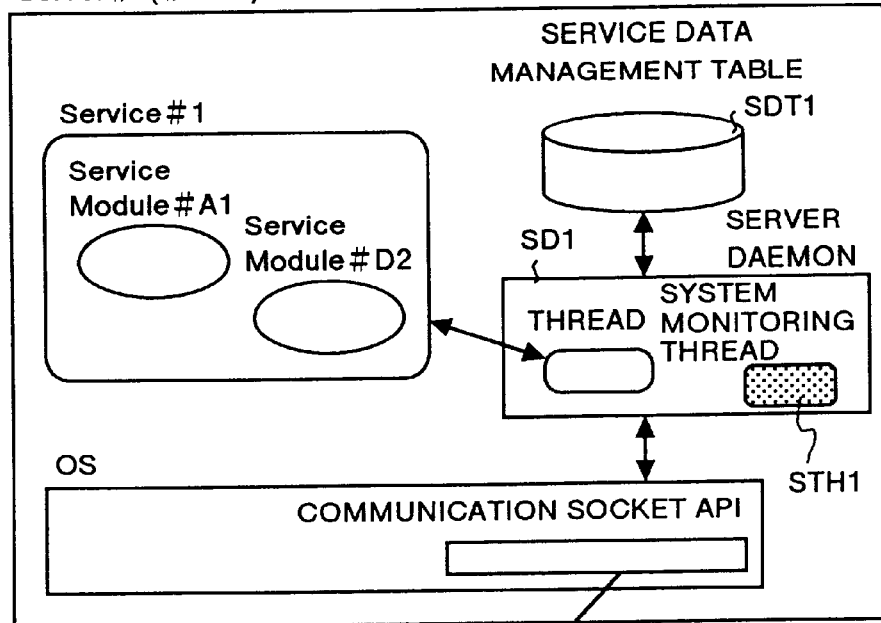
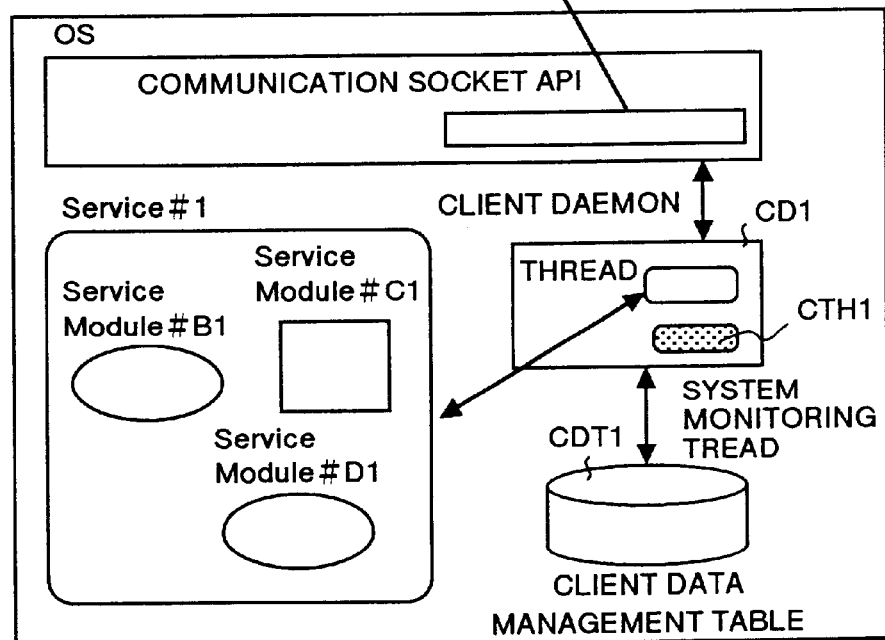

FIG.19

SERVICE MODULE NAME : ServiceModule # C1
DEFAULT SERVICE NAME : Service # 1
LIST OF CLIENT ADDRESS FOR DELIVERY : # 0011, # 0012, # 0013
MODULE TYPE : 3
PLATFORM TYPE : 1
VERSION NUMBER : 1
STATUS FLAG :
ACCESS ID IN LOCAL EXECUTION :
SERVER ADDRESS IN REMOTE EXECUTION :     ACCESS ID :

FIG.20

SERVICE MODULE NAME : ServiceModule # D1
DEFAULT SERVICE NAME : Service # 1
VERSION NUMBER : 1     ACQUIRED SERVER ADDRESS : # 0001
STATUS FLAG : 1
ACCESS ID IN LOCAL EXECUTION : 111
SERVER ADDRESS IN REMOTE EXECUTION :     ACCESS ID :

FIG.21
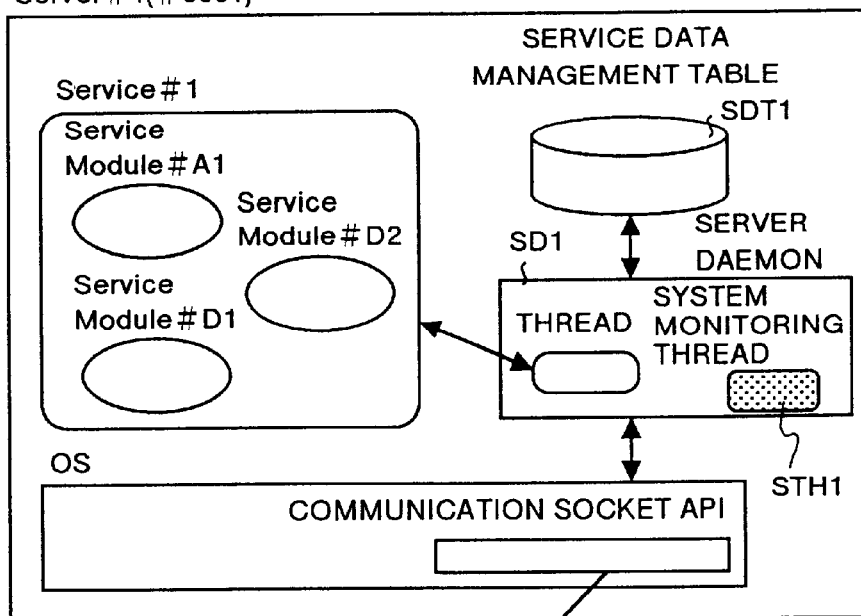
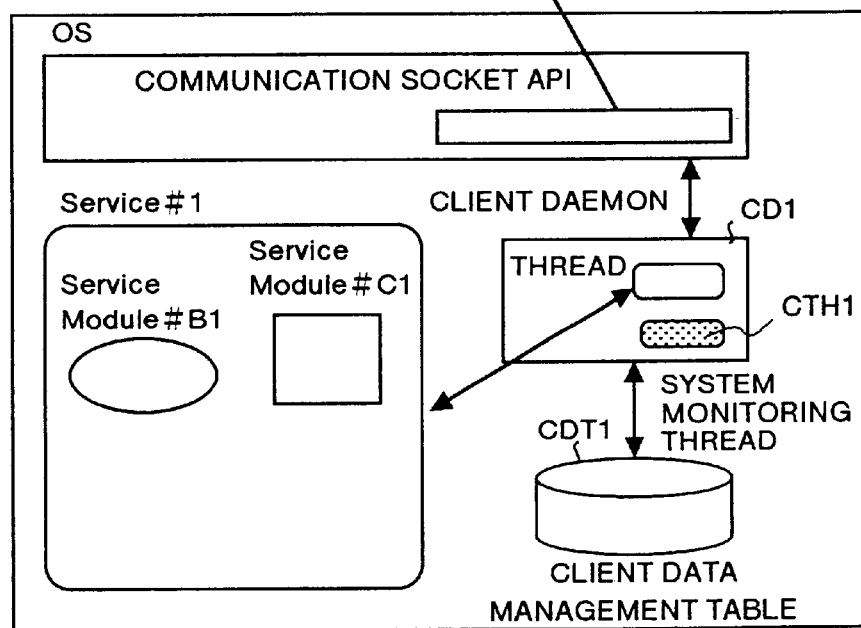

FIG.22

| | |
|---|---|
| SERVICE MODULE NAME : | ServiceModule#D1 |
| DEFAULT SERVICE NAME : | Service#1 |
| LIST OF CLIENT ADDRESS FOR DELIVERY : | #0011 |
| MODULE TYPE : | 4 |
| PLATFORM TYPE : | 0 |
| VERSION NUMBER : | 1 |
| STATUS FLAG : | 1 |
| ACCESS ID IN LOCAL EXECUTION : | 222 |
| SERVER ADDRESS IN REMOTE EXECUTION : | ACCESS ID : |

FIG.23

| | |
|---|---|
| SERVICE MODULE NAME : | ServiceModule#D1 |
| DEFAULT SERVICE NAME : | Service#1 |
| VERSION NUMBER : 1 | ACQUIRED SERVER ADDRESS : #0001 |
| STATUS FLAG : 2 | |
| ACCESS ID IN LOCAL EXECUTION : | |
| SERVER ADDRESS IN REMOTE EXECUTION : #0001 | ACCESS ID : 222 |

FIG.25

SERVICE MODULE NAME : ServiceModule#D2
DEFAULT SERVICE NAME : Service#1
LIST OF CLIENT ADDRESS FOR DELIVERY :
MODULE TYPE : 4
PLATFORM TYPE : 0
VERSION NUMBER : 1
STATUS FLAG : 2
ACCESS ID IN LOCAL EXECUTION :
SERVER ADDRESS IN REMOTE EXECUTION : #0002  ACCESS ID : 333

FIG.26

SERVICE MODULE NAME : ServiceModule#D2
DEFAULT SERVICE NAME : Service#1
VERSION NUMBER : 1    ACQUIRED SERVER ADDRESS : #0001
STATUS FLAG : 2
ACCESS ID IN LOCAL EXECUTION :
SERVER ADDRESS IN REMOTE EXECUTION : #0002  ACCESS ID : 333

SYSTEM, APPARATUS, METHOD AND COMPUTER PROGRAM PRODUCT FOR PROCESSING DISTRIBUTED SERVICE MODULES

FIELD OF THE INVENTION

The present invention relates to a distributed processing system comprising a server and a client connected to each other through a network for providing services to a user, a distributed processing method, a computer-readable recording medium with a program for making a computer execute the method recorded therein, a server, and a client device. More specifically, this invention relates to a distributed processing system which reduces work loads to the server and the client both when executing a service program required for realizing the service and also reduces the needs for maintenance of the service program, a distributed processing method, and a computer-readable recording medium with a program for making a computer execute the method recorded therein, a server device and a client device.

BACKGROUND OF THE INVENTION

In recent years, with consolidation and improvement of infrastructure for communications and also with popularization of LAN (Local Area Network) or the Internet, a distributed processing system enabling users to receive desired services through a network has been generally used. Especially the client server system comprising a plurality of client devices (described simply as client hereinafter) used by the user and a server device (described simply as server) which provides the services, with which a client can receive a desired service by accessing the server, has been established as an optimal network connection system for sharing or managing service resources on the network.

On the other hand, by expanding mutual connection between networks each independently functioning in an area or in a business organization from LAN to WAN (Wide Area Network) and further to Internet, a scale of networks to which a user, namely the client can be connected is becoming larger. Further, a number of users making use of a network, namely a number of the clients belonging to each network is also increasing, and with the expansion of the network scale as described above, work load to a server and communication traffics have been becoming disadvantageously larger.

To solve the problems as described above, at present, there is a tendency for distribution of work load during execution of services by preparing a plurality of servers corresponding to types of services to be provided even in a small-scale network. For instance, various types of server such as a data base server for providing a data base service, a file server for managing files in batch, a mail server for managing electronic mails (emails), and a computational server dedicated for large-scale and complicated computation are distributed on a network.

As described above, because technological progress in the field of software for service transaction on a network is observed, a technological progress in devices connected to a network, especially in hardware available as a client is strongly desired. A client generally comprises a CPU (Central Processing Unit) for executing an operating system or various types of application programs, a memory for storing therein data or programs executed by the CPU, input devices such as a keyboard or a mouse, and a display unit such as a CRT or a liquid crystal display. A server has the same configuration as that of a client, but sometimes peripheral device(s) for providing various types of service may be connected thereto.

As for configuration of a client, the specification is largely classified according to the type of the CPU used, and in many cases, by employing an operating system suited to this CPU the client may be operate as a stand-alone machine.

Thus, even between clients based of different types of hardware specifications, there are needs and inevitability for effective utilization for common resources by connecting the resources to a network. Namely, user's demands for receiving required services provided through a server from clients in which different types of hardware specifications are used increasingly becoming higher. To satisfy the needs and demands, it is required to provide a service program for accessing a server which provides the services, in addition to execute communications using the same communication protocol as that employed in the network, namely to make the communication interfaces common. This service program is executed on the client, so that the service program must be prepared discretely according to hardware specifications of the client, especially an operating system being used on the client.

In the distributed type of groupware or distributed type of network services or the like based on the conventional technology, functions required for the services are previously registered in a server or a client in the form of the above mentioned service program. This service program flexibly responds to the differences in the interfaces between different types of hardware specifications or differences in the interfaces between the operating systems and provides services from the servers to the clients.

As an example of a case in which a client receives services from a server, a case in which a client acquires desired data from a data base of the server is explained here. The server as a destination for access comprises a storage device such as a large capacity hard disk or the like. This server is a data base server with a data base constructed on a memory area of this storage device. The client has a service program (described as retrieving program hereinafter) previously installed therein for accessing this data base server to retrieve and acquire desired data.

To begin with, the client starts the retrieving program. It is assumed herein that connection with the data base server has been established at this stage. This retrieving program generally includes a query input processing for accepting input of conditions for retrieving (a query), and a result display processing for displaying a result of retrieving transferred from the server. A user completes input of a query using an input device provided in the client and by inputting keywords or successively selecting the categories shown by the retrieving program.

When query input processing is over, the retrieving program transmits information for the inputted query to the data base server, and requests for retrieval and transfer of the data. A service program corresponding to the retrieving program of the client is executed as a daemon in the data base server. The data base server identifies the data desired by the user from the vast amount of data accumulated in a storage device of the server immediately when information for the query is received from the client. Then the data base server transmits the identified data to the client who had requested the data.

The retrieving program in the client receives this data transmitted from the data base server and displays the data on a display unit. Thus, the user can acquire the desired data.

As described above, the client can make use of a vast amount of required data only by incorporating a retrieving program which is a relatively small scale program as the service program.

As an another example of the distributed processing system based on the conventional technology, there is the client server system disclosed in Japanese Patent Laid-Open Publication No. HEI 10-21081. This client server system divides an application program being executed by a client (a service program) into a plurality of modules which can be executed discretely. The application program comprising the plurality of modules is stored in a storage device of the server. When a client accesses this server to make use of any service, the client downloads in a storage device of the client only the module(s) required for execution of the program of application programs stored in the server and executes the module(s).

While executing one module, if it is required to execute another module, the client downloads this additionally required module from the server. When downloading a module(s), if a total volume of the down-loaded module (s) exceeds a specified capacity, the surplus module(s) is deleted from the storage device of the client. Thus, even when the client is required to execute an application program requiring a large amount of memory, no excessive work load occurs to resources of the client such as the storage device.

As described above, in the distributed processing system according to the conventional technology, resources on a network can be shared by a plurality of clients. Further, connection to a network can be established among a number of clients each having different specifications by using a common communication interface in order to use the services provided by a server.

However, in the distributed processing system based on the conventional technology, service programs registered in servers and clients are rather fixed, and when it is required to change a portion of functions of a server or to add more functions to a service, the entire service program registered in the server or the client must be modified, which makes it difficult to provide effective maintenance services.

Generally the service programs are clearly classified into those for a server and those for a client, so that it is difficult to shift a place of execution of service processing for distributing a work load to multiple sites according to a processing capability of functions of the client or the server.

Further, in the distributed processing system based on the conventional technology, a user can select a service program to be registered in a client according to resources in or functions of the client, but this restricts a range of services which each client can make use of, and each client can not always use all of the services provided by a server, and this restriction of services dependable client is disadvantageous.

Further in the distributed processing system based on the conventional technology, generally a user or a system manager is required to previously install a service program corresponding to a type of a client for each client, which increases a work load to the user or the system manager.

According to the necessity of installment of a service program as described above, when additional functions are added to a service program or some functions of a service program are changed, it is required to reinstall the service program as a whole in a server or a client device, and maintenance service for each discrete function of a service program is difficult. Further, there is the problem that it is difficult for each of the user to accurately know the time of updating a service program.

In distributed type of groupware or in a distributed type of network service based on the conventional technology, in many cases a multi-user system assuming a plurality of users with respect to one client device is employed. Therefore, even if different functions for a service are to be provided for each user, all functions of the service program are required to be maintained at the client, and this configuration does not always insure efficient utilization of resources of the client.

In the client server system disclosed in Japanese Patent Laid-Open Publication No. HEI 10-21081, a service program is modularized, and only required modules are downloaded into a client, so that the problems as described above, namely the necessity of a work for installing a service program, difficulty in maintenance of each discrete function of a service program, and difficulty in efficient use of resources of a client are solved. However, in this client server system also it is difficult for each user to accurately know the time of updating of a service program.

Further, in the above client server system, when a client receives a service from a server, the client is always required to download a module or modules from the server. When the modules are downloaded, at least a time for this downloading operation is required until a CPU of the client can execute the module, and when new modules are successively called out for execution of a service program, the through-put drops because of an increase in the work load to the client, an increase in the work load to the server, and an increase in the communication traffic.

In the above client server system, effective use of resources of the storage device is possible. However, there is no consideration for reduction of a work load to a CPU when a client accesses a plurality of servers simultaneously, nor for elimination of an excessive work load to a non-volatile memory where the CPU actually executes a service program, so that performance of the entire network including other servers or clients is not always improved.

SUMMARY OF THE INVENTION

It is an object of the present invention to provide a distributed processing system enabling smooth utilization of services from a server regardless of difference in types of clients.

In the present invention, a server delivers an initial setting module capable of acquiring a module different for each client and required for execution of a service from a server according to a request of the client, and the client can acquire only the required service modules from the server and make use of the service by acquiring the initial setting module from the server and executing the initial setting module. Thus, even if clients each based on different hardware specifications or running on a different operating system are connected to the network, each client can utilize any service provided by the server only by acquiring the initial setting module according to the client regardless of differences in hardware specifications or operating system. Further, each client can automatically acquire the required initial setting module with the service utilizing unit, so that a user can easily make use of any service provided by the server without being required to be aware of a type of the client device.

In the present invention, a server comprises a common module which can run in any environment for execution, so that, when resources in the server are short, a place of execution of the common module which should originally be executed in the server can be shifted to another server. Thus, for instance, during execution of a service program, when resources in the server become short because of simultaneous access by many clients to the server, the common module which should have been executed by the server can be executed in another server in which resources are still not short, and drop of throughput due to shortage of resources in a server can be evaded.

In the present invention, a common module which can be executed in the server's environment or in the client's environment is provided, so that, when resources in the client become short, the place of execution of the common module to be originally executed in the client can be shifted to the server. Thus, for instance, when resources in the client become short during execution of a service program due to execution of other application program or the like, the common module having been executed in the client can be executed in the server, and drop of throughput due to shortage of resources in a client can be prevented.

In the present invention, a server can notify a client of updating of a service module, and the notice is given to any client to which the service program was delivered in the past. Thus, the user of the client is not required to be aware of a period of updating of the module especially in the server, and at the same time efficient processing for updating a service module is possible.

With the present invention, a server delivers an initial setting module enabling delivery of a service module different for a type of each client. Thus, when it is necessary to change a service module required for a service program for utilizing a service in a client, the requirement can be satisfied only by changing the contents of the initial setting module, so that management of a number of modules present for each client type becomes easy.

In the present invention, a common module operable in an environment for execution is provided in a server, and when resources in the server become short, a place of execution of the common module which should originally have been executed in the server can be shifted to an another server. Thus, when resources in the server become short, the common module which should have originally be executed in the server can be executed in the another server in which resources are still not short, and drop of throughput of a server can be prevented.

With the present invention, of a plurality of common modules, only the common modules required to dissolve shortage of resources are shifted to other servers for execution therein, so that an excessive work load to resources in servers to be started can be prevented.

With the present invention, access to a common module requested to start can directly be made not only by a server which had issued the request, but also by all clients requiring execution of the common module, so that shared use of a common module requested to start can easily be realized.

With the present invention, a place of execution of a common module is managed with a module execution place table, so that access to a desired common module can easily be made by referring to this module execution place table.

With the present invention, updating of a service module is notified only to the clients requiring acquisition of an updated service module by referring to a module delivery destination table, so that efficient processing for updating a service module can be made.

In the present invention, a client can acquire only the service modules required in the client by acquiring an initial setting module from a server with a service utilizing unit and executing the initial setting module. Thus, even when clients each based on different specifications or running on a different operating system are connected to the network, each client can make use of any service provided by the server regardless of difference in specifications or operation system, and the user can easily make use of any services provided by the server without being required to be aware of a type of the client.

In the present invention, a mechanism for checking the functions and processing capability of a client is provided in a service utilizing unit executed in the client, and a service module to be acquired from a server can be selected according to a result of checking acquired by executing this checking mechanism when the initial setting module is executed. Thus, for instance, when a result of checking indicates drop of processing capability of the client, only the service modules that can be executed in the client are acquired and executed, while execution of other service modules required for using the service can be requested to other servers, so that smooth utilization of services is possible in a client.

In the present invention, when a service module required for using the service is not registered in a client data management table, the service module is acquired from the server and is registered in the client data management table. Thus, only a minimum number of required service modules can be stored in a attached storage device, and effective utilization of resources in a client can be realized.

In the present invention, when resources in a client become short during execution of a common module operable in an environment for execution client, the place of execution of the common module which should have originally be executed in the client can be shifted to a server. Thus, when shortage of resources occurs in the client, a common module having been executed in the client can be executed by the server in which resources thereof are still not short and drop of throughput in a client can be prevented.

With the present invention, of a plurality of common modules being executed, only the common modules required for dissolving shortage of resources can be started in a server, so that an excessive work load to resources in a server to be started can be prevented.

With the present invention, a place of execution of a common module can be managed with a module execution place table, so that access to a desired common module can easily be made by referring to this module execution place table.

With the present invention, when updating of server module is notified from a server, the updated service module is acquired with an updated module acquiring unit, so that a user is not required to be aware of a period for updating a module in a server and at the same time efficient processing for updating a service module is possible.

Other objects and features of this invention will become understood from the following description with reference to the accompanying drawings.

BRIEF DESCRIPTION OF THE DRAWINGS

FIG. 16 is an explanatory view showing system configuration when a service in a distributed processing system according to Embodiment 1 of the present invention has not been started;

FIG. 18 is an explanatory view showing system configuration when a service in the distributed processing system in Embodiment 1 has been started;

FIG. 19 is an explanatory view showing service module data for an initial setting module ServiceModule #C1 for the Server #1;

FIG. 20 is an explanatory view showing service module data for a common module ServiceModule #D1 for the Client #1;

FIG. 21 is an explanatory view showing system configuration when a service in the distributed system according to Embodiment 1 has been started;

FIG. 22 is an explanatory view showing service module data for a common module ServiceModule #D1 for the Server #1;

FIG. 23 is an explanatory view showing service module data for a common module ServiceModule #D1 for the Client #1;

FIG. 25 is an explanatory view showing service module data for a common module ServiceModule #D2 for the Server #1; and FIG. 26 is an explanatory view showing service module data for a common module ServiceModule #D2 for the Client #1.

DESCRIPTION OF THE PREFERRED EMBODIMENTS

Figure 1:
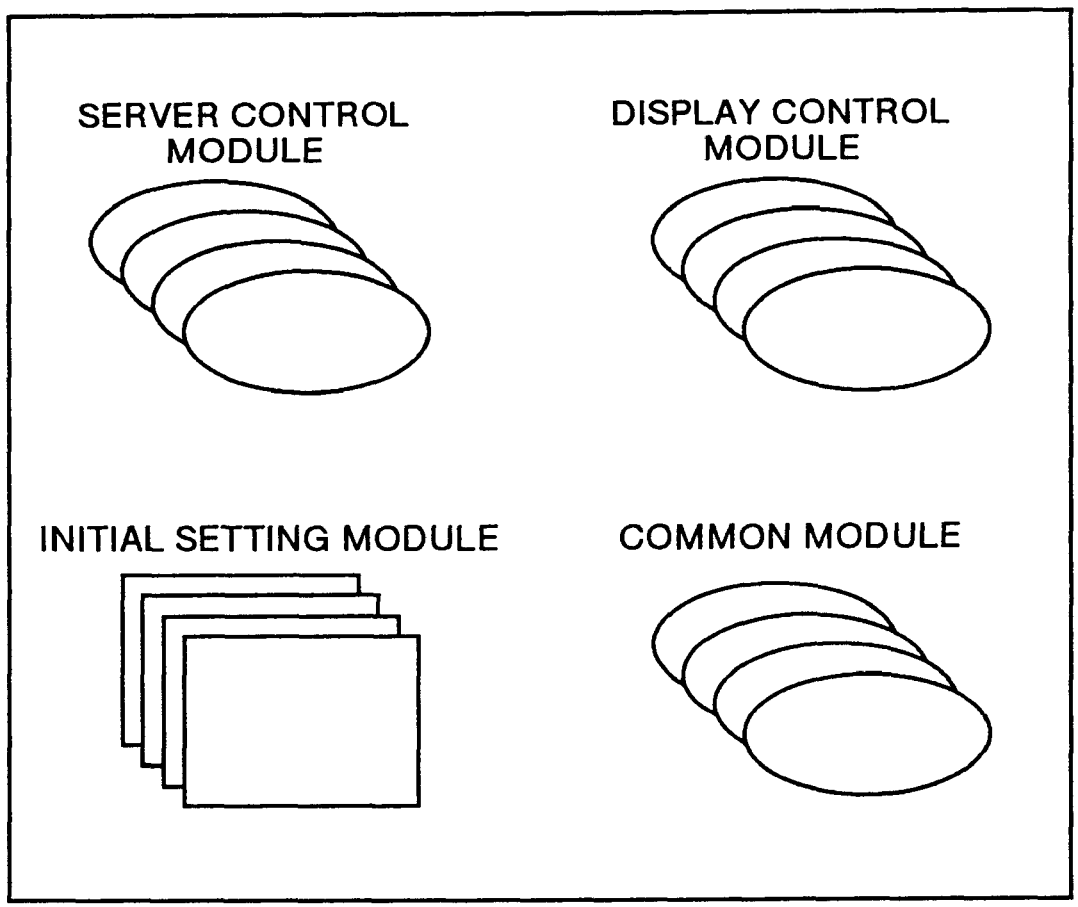
FIG. 1 is an explanatory view showing module configuration of service data prepared for each service provided in a distributed processing system according to the present invention.

Detailed description is made for embodiments of a distributed processing system, a distributed processing method, a server, and a client device according to the present invention with reference to the drawings. It should be noted that the present invention is not limited by the embodiments described below. Herein, principles of each of the operations executed in the distributed processing system, distributed processing method, server, and client device each according to the present invention is described first, and then description is made for specific embodiments operating through each processing.

The distributed processing system according to the present invention comprises a LAN, and a communication line network such as a telephone line or a dedicated line, namely at least one server and at least one client are connected to a network, and in this system a client can use services mainly provided by a server as shared resources on the network. Especially, an environment is provided in which a service received by a client can smoothly be executed by connecting a plurality of servers to a network and distributing a work load for execution of the service to the plurality of servers.

In this distributed processing system, by using a common communication interface, a plurality of clients each based on a different hardware specifications or running on a different operating system may be connected to the network.

The service as defined herein is to provide various types of data from a server to a client in response to a request from the server, and includes a data base service or a computation service. Therefore, it is required for a server to have a service program dedicated to the server for execution of a desired service in response to a request from the client, and also it is required for the client to have a service program dedicated to the client for requesting a service to the server.

A client comprises an operating system, a service program for the client as explained above, a CPU for executing other application programs, a communication interface for connection to a network, a storage device for storing therein data or a program to be executed by the CPU, an input device such as a keyboard or a mouse, and a display unit such as CRT or a liquid crystal display. Ordinary computer system can be used as this client. A server has the same configuration as that of a client, however, a peripheral device(s), such as the one which enables high speed processing for a multi-processor with a plurality of CPUs, or a large memory capacity storage device, or a peripheral device which can provide various types of service may be connected thereto. It should be noted that the storage device described above includes a memory unit or a hard disk device such as a RAM or a ROM, and a drive unit with a removable recording unit such as an IC card memory, a floppy disk, an optical magnetic disk, or a CD-ROM mounted thereon.

In the distributed processing system according to the present invention, the service program as described above comprises a plurality of modules each operable discretely, and both a service program for a server and a service program for a client can be executed module by module. A group of modules forming a service program for a client can be delivered as service data from a server to a client, and maintenance and management of these modules (described as service module hereinafter) is mainly executed by a server.

FIG. 1 is an explanatory view showing module configuration of service data prepared for each provided service. As shown in FIG. 1, the service data is divided to a server control module required for execution of a service in a server, a display control module for providing controls over display on a display unit provided in a client for I/O control of a graphical user interface (GUI) or the like, an initial setting module prepared for each type of client and for defining a method of acquiring service modules required by a client from a server and checking processing capability and a load state of the client, and a common module capable of executing a service module in any client or in any server.

A service program for the server or a service program for the client is formed by combining required service modules in the service data shown in FIG. 1, and a plurality of service modules (including a server control module, a display control module, an initial setting module, and a common module) may be provided therein.

For instance, a service program for a server may have a plurality of server control modules, while a service program for a client may have one initial setting module, a plurality of display control modules, and a plurality of common modules.

Figure 2:
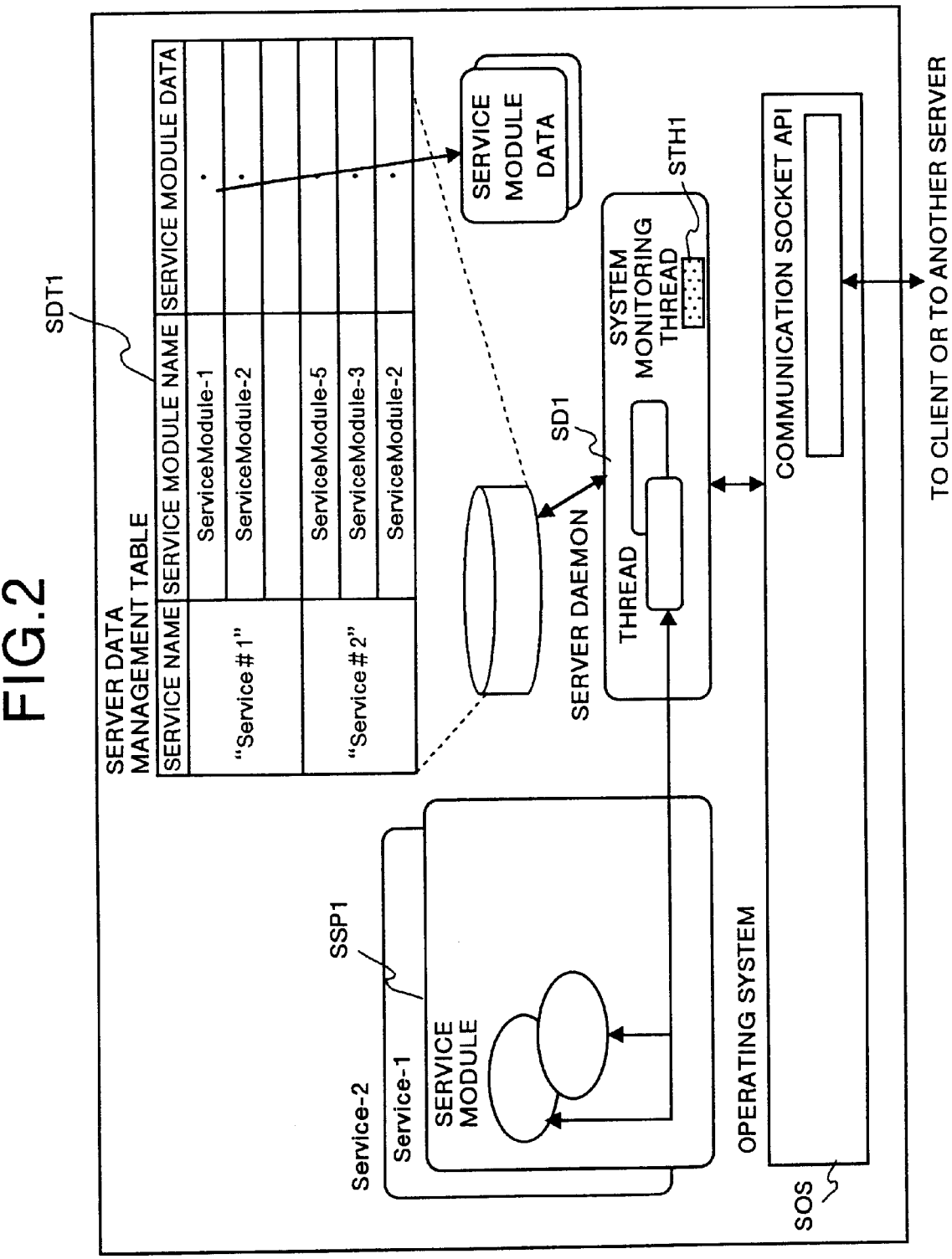
FIG. 2 is an explanatory view showing a system execution state in a server according to the present invention.

FIG. 2 is an explanatory view showing a system execution state of a server. A server daemon SD1 resides in the server and it accepts requests for connection from a plurality of clients, delivers the service modules, and also controls services from a server in an environment for execution of an operating system SOS. When a request for execution of a service from a client is received, a thread for executing a service module for the requested service program SSP1 (Service 1) is generated and the service module is executed.

The server daemon SD1 includes a system monitoring thread STH1 which continuously manages the processing capability of and a work load to the server. This system monitoring thread STH1 monitors the system of the server at a specified time interval. Further, the server has a server data management table SDT1 for managing the information on service modules registered in the server and in the client. The server executes data input/output to and from the thread in the server daemon SD1 by referring to this server data management table according to the necessity.

The server daemon SD1 executes input/output of data and instructions to and from the operating system SOS. The operating system SOS executes data input/output to and from a network through a socket API (Application Program Interface), namely establishes connection with a client or with other server.

Figure 3:
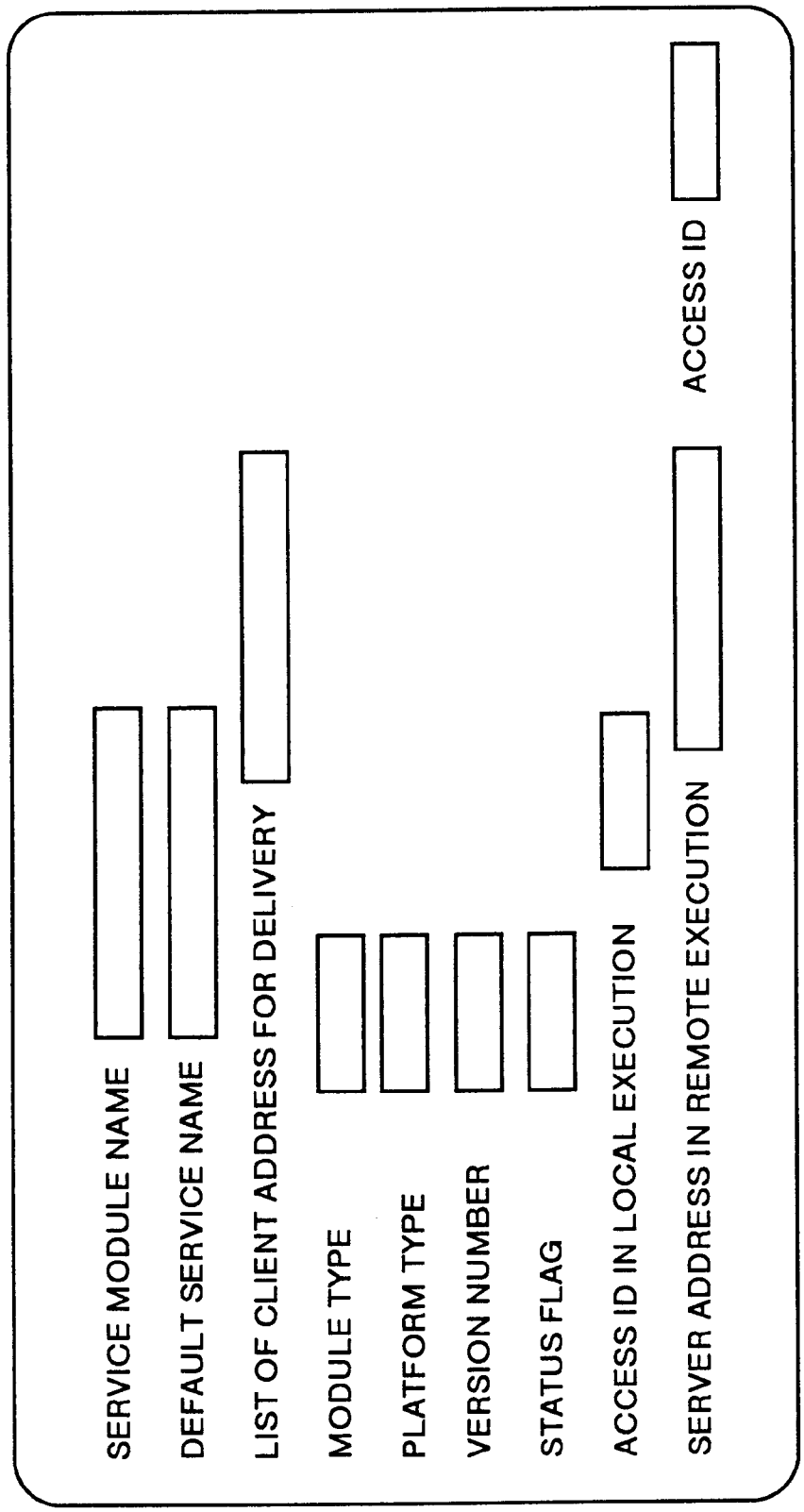
FIG. 3 is an explanatory view showing service module data for each service module in a server management table according to the present invention.

The server data management table SDT1 comprises names of services provided by a server, names of server modules required for execution of each service, and service module data including information concerning version number and execution state of each service module. FIG. 3 is an explanatory view showing service module data for each service module in the server data management table SDT1.

As shown in FIG. 3, service module data in the server data management table SDT1 comprises, for instance, "Service module name" for each service, "Default service name" indicating services available in the initial state, "List of client address for delivery" indicating a list of clients to which the server delivered the service module, "Module types" indicating types of the module (such as a server control module, a display control module, an initial setting module, or a common module), "Platform type" indicating an operating system or hardware specifications of the client, "Version Number" of the service module, "Status flag" indicating a place of execution of each service module, "Access ID in local execution" indicating access code to each service module when the "Status flag" indicates local execution, "Server address in remote execution" indicating an address of a server to which the service module belongs when the "Status flag" indicates "Remote execution", and "Access ID" indicating access code to a service module when the "Status flag" indicates "Remote execution".

Figure 4:
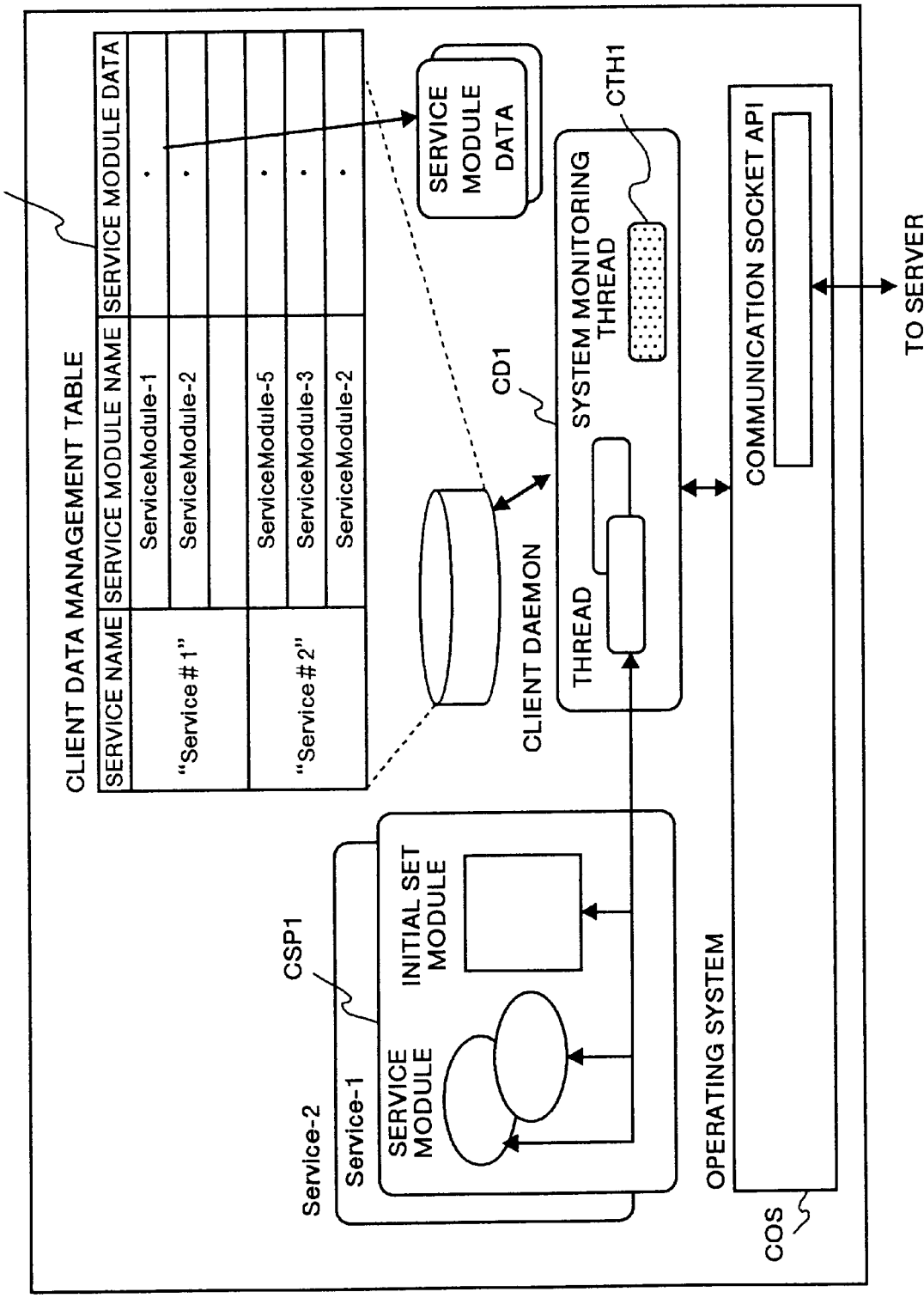
FIG. 4 is an explanatory view showing a system execution state in a client according to the present invention.

FIG. 4 is an explanatory view showing an embodiment of a system of a client. A client daemon CD1 is residing in this client and it executes communications with a server in an environment for execution of an operating system COS. The operating system COS in the client need not always be the same as the operating system SOS for the server.

When a request for execution of a service is issued from a user, a thread for execution of service modules for a desired service program CSP1 (Service-1) is generated in the client daemon CD1, and this service modules are executed.

The client daemon CD1 includes a system monitoring thread CTH1 which continuously monitors the processing capability of and a work load to the client. This system monitoring thread CTH1 monitors the system of the client at a specified period of time. Further, the client has a client data management table CDT1 for managing information on service modules acquired from a server and registered in the client. The client executes data input/output to and from the thread in the client daemon CD1 by referring to this client data management table CDT1 according to the necessity.

The client daemon CD1 executes input/output of data and instructions to and from the operating system COS. The operating system COS executes data input/output to and from a network through a socket API for communications like in a server, namely establishes a connection with a server.

Figure 5:
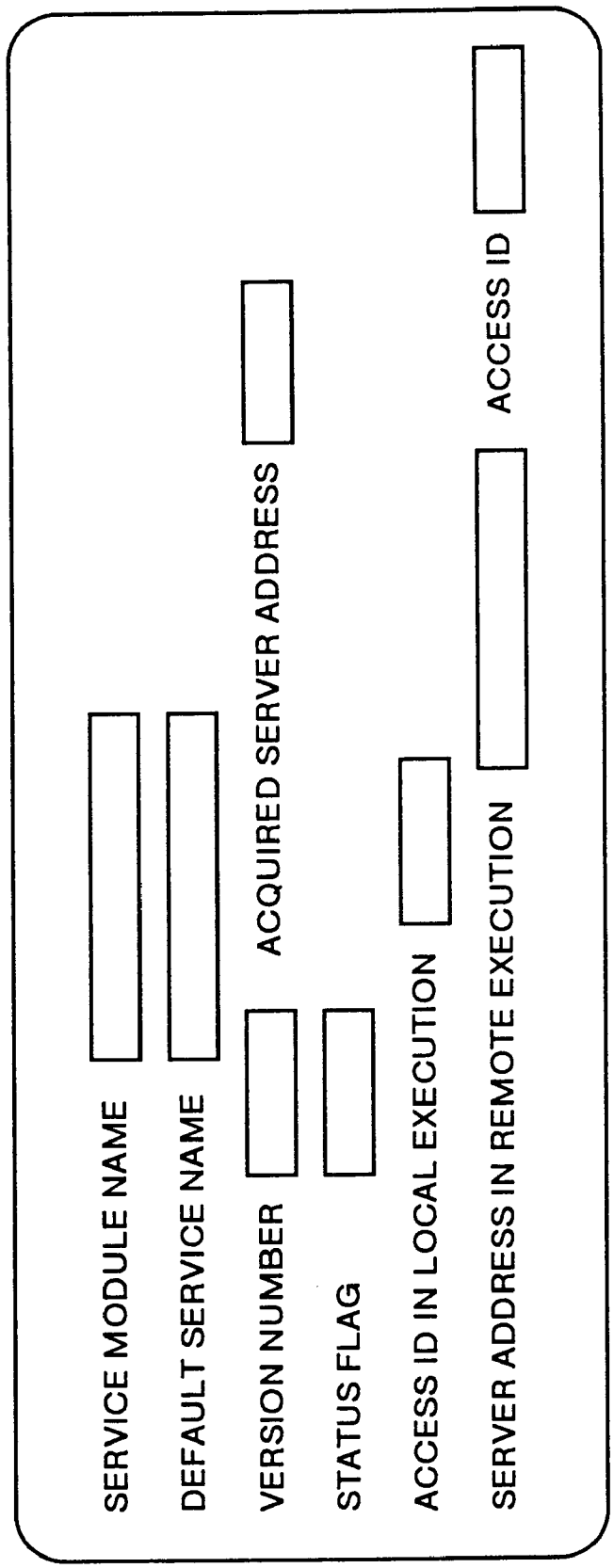
FIG. 5 is an explanatory view showing service module data for each service module in a client data management table according to the present invention.

The client data management table CDT1 comprises names of services registered in the client, names of service modules required for execution of each of the services, and service module data including information concerning version number and execution state of each service module. FIG. 5 is an explanatory view showing service module data for each service module in the client data management table CDT1.

As shown in FIG. 5, service module data in the client data management table CDT1 comprises, for instance, the "Service module name", "Default service module name", "Version number", "Status flag", "Access ID in local execution", "Server address in remote execution", "Access ID" each described in relation to FIG. 3 above, and "Acquired server address" indicating an address of a server from which the service modules are acquired.

Next description is made for a flow of operations executed until a service is started in the execution state of a server and a client shown in FIG. 2 and FIG. 4.

(Processing for Starting the Client Daemon)

At first, in a terminal device functioning as a client, in many cases, the client daemon CD1 is executed in an environment for execution of the operating system COS simultaneously when the client is started. When the client daemon is started, a thread generated as a client daemon is ready for execution, and the client daemon CD1 executes data input/output according to contents of execution in each thread.

Figure 6:
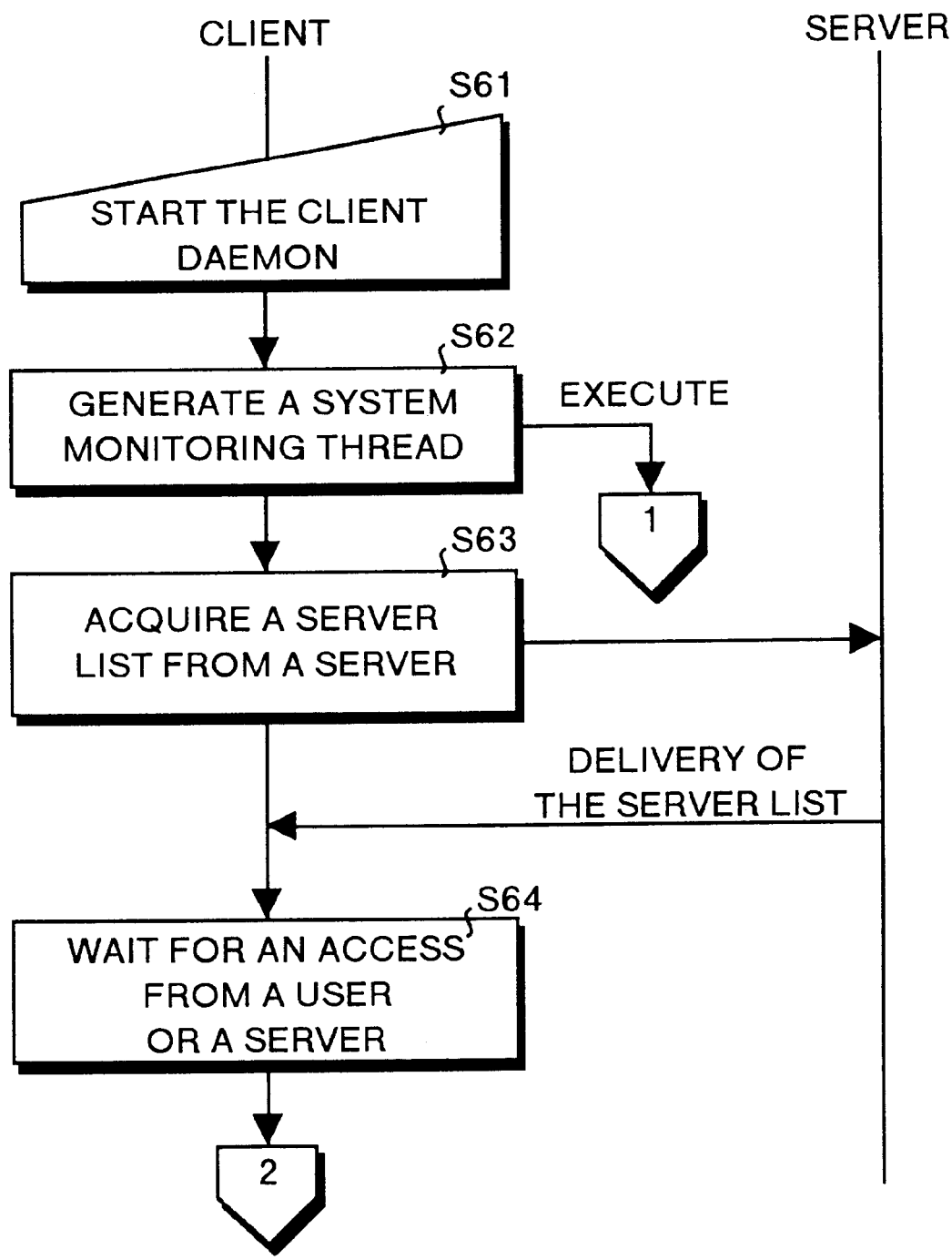
FIG. 6 is a flow chart showing processing executed when a client daemon according to the present invention is started.

FIG. 6 is a flow chart showing the processing executed when the client daemon CD1 is started. As shown in FIG. 6, at first, the client daemon CD1 is started (step S61) by a task start program automatically started simultaneously when the operating system COS is started. The client daemon CD1 receives a message from a server, and transmits a request for message from a service module executed in the client.

Service modules executed in a client include the display control module for control events for selection or execution of a service such as pressing of a button or input of a text, the initial setting module enabling acquisition of service modules according to the type of the client, and the common module not dependent on the place of execution (whether a service module is executed in the client or executed in the server).

When this client daemon CD1 is started, a system thread CTH1 for monitoring the processing capability of or a work load to the client is generated and executed (step S62). After the system monitoring thread CTH1 is generated, a list of services currently registered in the server, namely a list of services which the server can provided is acquired (step S63).

In reality, a thread for acquiring a service list from a server is generated in the client daemon CD1, and this thread demands the operating system COS to acquire the service list. The operating system COS (more specifically communication socket API) demands a server accessible from the client to deliver the service list.

As described above, also the thread for acquiring a service list functions as a service module, which is indispensable module in a client. Thus, a user can acquire a service list from a server not only when the client daemon CD1 is started, but at any time according to the necessity.

When the service list is delivered from a server, the service list acquisition thread or a thread previously registered for the display control module provides GUI display according to the service list displayed on a display unit of the client, and enters a state for waiting for an access from a user using an input device (user access) or an access from a server (server access) (step S64).

Herein the server access indicates transmission of a message from a server to a client or transmission of an instruction or data for a service module being executed in the client.

(Processing for Starting the Server Daemon)

Processing after step S64 shown in FIG. 6 is described later, and here description is made for the processing for starting the server daemon SD1. A terminal unit functioning as a server has the server daemon SD1 always residing therein in an environment for execution of the operating system SOS, and a thread created as a server daemon is always executed therein. A server may be accessed from a client any time, so that server should always be in the ready state excluding specific cases such as a maintenance work. Therefore, the processing for starting the server daemon SD1 is rarely executed. However, herein a case is described in which the server daemon SD1 is started when the server is started, or through operations by a system manager.

Figure 7:
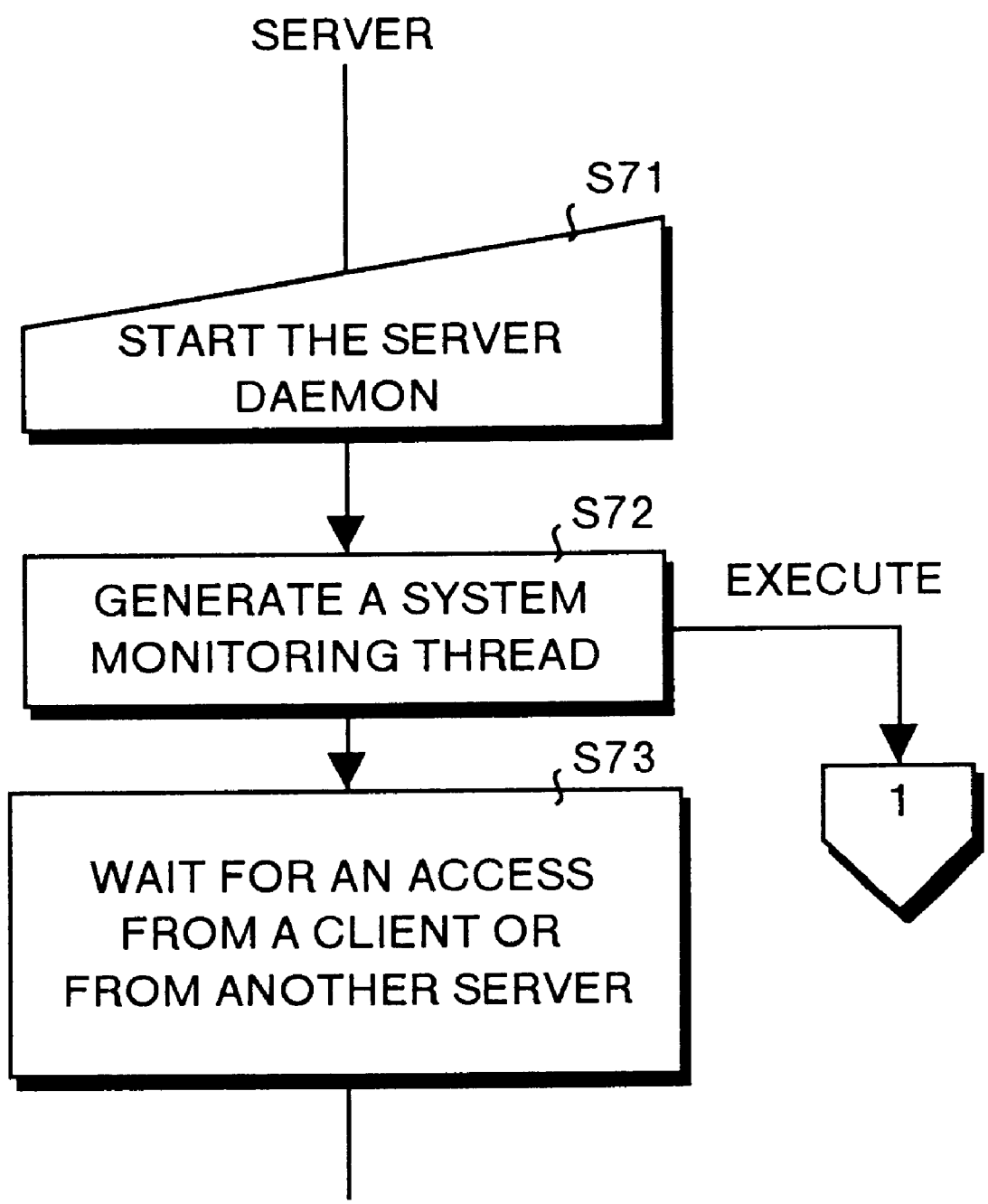
FIG. 7 is a flow chart showing processing executed when a server daemon according to the present invention is started.

FIG. 7 is a flow chart showing the processing executed when the server daemon SD1 is started. As shown in FIG. 7, at first the server daemon SD1 is started (step S71). The server daemon SD1 may receive messages from a client or other server, or transmit message requests from a service module executed in the server to a client or other server.

Service modules executed in a server include a server control module started upon start of any residing type of service or a request for starting a service, a common module not dependent on a place of execution of a service module (whether the service module is executed in a client or in a server).

When this server daemon SD1 is started, a system monitoring thread STH1 for managing the processing capability of or a work load to the server is generated and executed (step S72). When the system monitoring thread STH1 is residing, access from a client or access from other server is waited for (Step S73).

(Processing by the System Monitoring Thread)

Next description is made for the processing for execution of the system monitoring thread CTH1 described above (step S62) in the "Processing for starting the client daemon CD1" and the processing for execution of the system monitoring thread STH1 also described above (step S72) in the "Processing for starting the server daemon". It should be noted that the system monitoring threads CTH1 and STH1 execute a similar processing.

Figure 8:
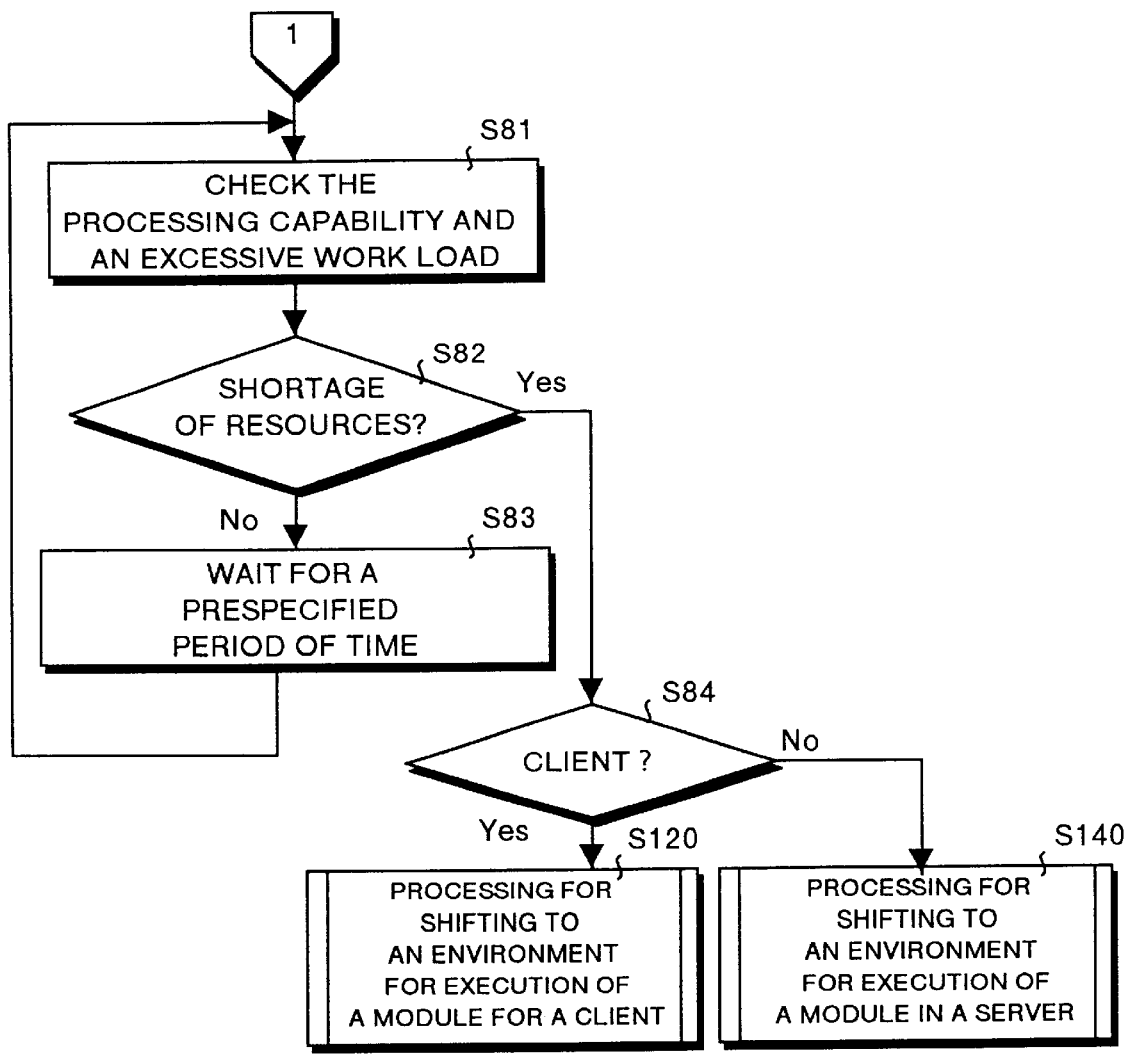
FIG. 8 is a flow chart showing processing with a system monitoring thread.

FIG. 8 is a flow chart showing processing due to a system monitoring thread. A system monitoring thread is provided in each client as well as in each server, and is generated by the client daemon CD1 and server daemon SD1. This system monitoring tread checks the processing capability of or a work load to a system in which the system monitoring tread is residing (server or client) (step S81). Herein operations for this checking the processing capability includes checking of a data accumulation capacity of a memory or a storage device, a number of empty communication sockets required for communications with a sever or a client, and an allowable number of generated threads. On the other hand, checking of a work load includes, for instance, checking for availability of a CPU or measurement by execution of a bench mark test.

Then it is determined whether a result of checking of the processing capability and the work load in step S81 indicates drop of the processing capability or excessive work load or not, namely whether there is a shortage of resources or not (step S82) When in step S82 it is determined that there is a shortage of system resources, further determination is made as to whether a place of execution of the system monitoring thread is in a client or not (step S84).

When it is determined in step S84 that the place of execution of the system monitoring thread is the client, processing for shifting a module execution environment for a client (step S120) described in detail below is executed. When it is determined in step S84 that the place of execution of the system monitoring tread is the server, the processing for shifting a module execution environment for a server (step S140) described in detail below is executed.

On the other hand, when a shortage of system resources is not detected in step S82, a waiting state is realized for a certain period of time (step S83), and after passage of this specified period of time, the processing in step S81 is again executed. Thus, in the processing due to the system monitoring tread as shown in FIG. 8, processing capability of and a work load to the system are checked at a specified time interval, and when the result of checking indicates shortage of resources, then the processing for shifting the module execution environment is executed depending on the place where the system monitoring thread is being executed (in a server or in a client).

(Processing for Acquiring an Initial Setting Module)

Figure 9:
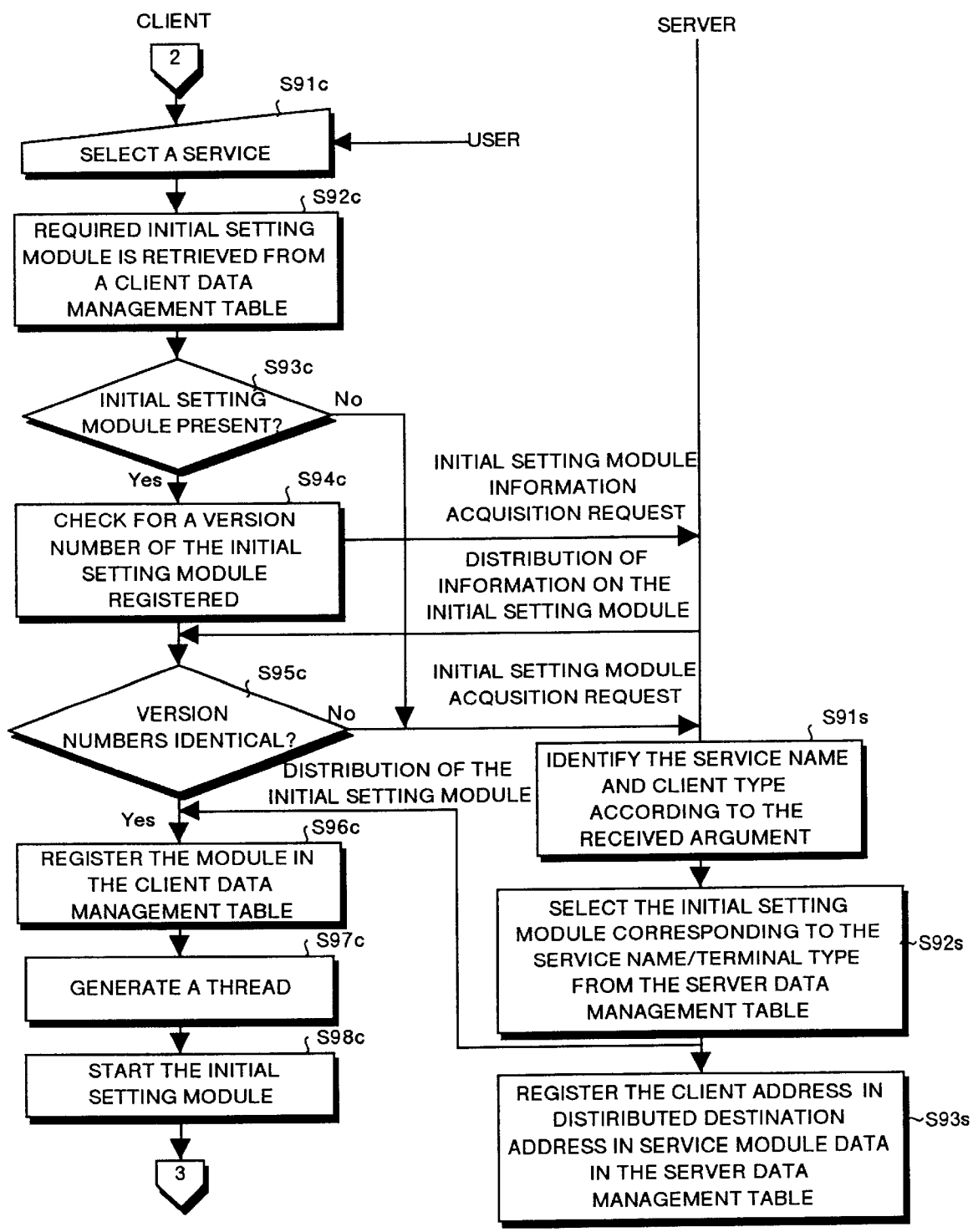
FIG. 9 is a flow chart showing processing for acquiring an initial setting module according to the present invention.

Next description is made for the processing for acquiring the initial setting module executed after a service is selected by a user in the user access or server access waiting state in step S64 shown in FIG. 6 and according to a result of the selection above. FIG. 9 is a flow chart showing the processing for acquiring the initial setting module.

As shown in FIG. 9, at first, the user selects a desired service using an input device such as a mouse or a key board from a service list displayed on a display unit of a client (step S91c) Then, an initial setting module required for execution of the selected service is retrieved from the client data management table CDT1 (step S92c).

Then determination is made as to whether the initial setting module has been registered in the client data management table CDT1 or not (step S93c). When it is determined in step S93c that the initial setting module has been registered in the client data management table CDT1, for checking a version number of the initial setting module registered in the server, of the initial setting modules registered in the server, information for the initial setting module is acquired (step S94c).

As the processing in step S94c, the client transmits a request for acquiring the information regarding the initial setting module having a service module name of the required initial setting module to the server. Then the client receives a response delivered from the server in response to this request, namely the client receives information regarding the initial setting module.

The information regarding the initial setting module received by the client has the same configuration as that of the service module data shown, for instance, in FIG. 3. The information on a version number included in this data is compared with the initial setting module information registered in the client, namely information on a version number included in the service module data shown, for instance, in FIG. 5, and it is determined whether the version numbers are identical or not (step S95c).

When it is determined in step S95c that the two version numbers are not identical, namely when the version number of the initial setting module registered in the client is older as compares to the version of the initial setting module registered in the server, as it is necessary to change the initial setting module in the client. Therefore, a request for acquisition of an initial setting module is transmitted to the server.

In step S93c, if it is determined that the initial setting module has not been registered in the client data management table CDT1, then also a request for acquisition of an initial setting module is transmitted to the server. The request for acquisition of an initial setting module includes a service name corresponding to the desired initial setting module, and numerical information for identifying a platform type (client type) identifying the type of hardware specifications or the operating system of the client.

The server identifies a service name and a type of the client according to the argument (the numerical information described above) received from the client (step S91s). Then the server selects an initial setting module corresponding to the service name and client type identified in step S91s (step S92s)

Then the server delivers the selected initial setting module in step S92s to the client having issued the initial setting module acquisition request. Of the service module data corresponding to the delivered initial setting module in the server data management table SDT1, the server registers an address of the client which had issued the initial setting module acquisition request in the "List of client addresses for delivery" (step S93s) after delivery of the initial setting module.

On the other hand, the client having received the initial setting module (more specifically, the client daemon CD1) registers the received initial setting module in the client data management table CDT1. When registering the module, an address of the server from which the initial setting module has been acquired is registered at the "Acquired server address" in the service module data shown in FIG. 5 (step S96c).

Then the client generates a thread for the initial setting module registered instep S96c (step S97c), and starts the initial setting module (step S98c).

The processing for acquiring an initial setting module described above may be included in the service list acquisition thread described above or in a service program comprising this thread, or a service module for executing the initial setting module acquisition processing may previously be registered.

(Processing With the Initial Setting Module)

Figure 10:
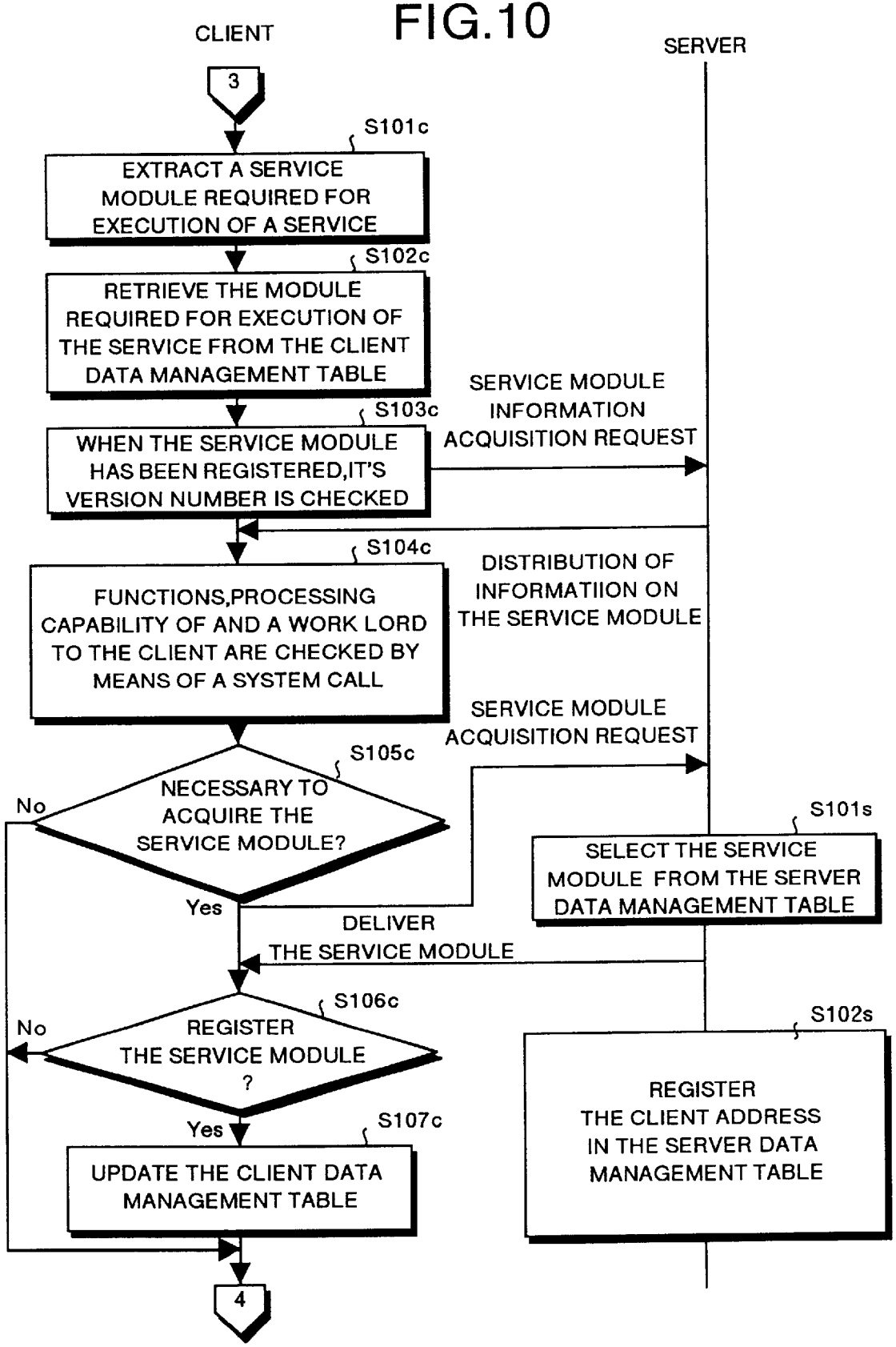
FIG. 10 is a flow chart showing processing with the initial setting module according to the present invention.

The processing following the step S98c shown in FIG. 9, namely the processing with the initial setting module is explained. FIG. 10 is a flow chart showing the processing due to the initial setting module. As shown in FIG. 10, at first the initial setting module extracts a service module required for execution of a service from the information defined therein (step S101c).

Then the initial setting module retrieves the service module extracted in step S101c from the client data management table CDT1 (step S102c). In step S102c, when the service module as objects for retrieval from the client data management table CDT1 can be identified, namely when the service module as objects for retrieval has been registered in the client data management table CDT1, the version numbers of the service module is checked (step S103c).

When checking a version number of a service module in step S103c, at first, to acquire a version number of a service module registered in the server, it is necessary to transmit a request to the server for acquisition of the corresponding service module of the service modules registered in a server.

After transmission of such a service module information acquisition request, the client receives a response delivered from the server, namely the required service module information. The initial setting module acquires information on a version number from the received information on service module. If it is necessary to acquire information on a plurality of service modules, it is possible to acquire the information on the plurality of service modules by transacting with the server only once in a batch.

On the other hand, as for a service module registered in a client, information on a version number of the service module can be acquired from service module data corresponding to the object service module in the client data management table CDT1.

The server identifies the service module according to information included in the service module acquisition request received from the client, and selects the identified service module from the server data management table SDT1 (step S101s).

Then the server delivers the service module selected in step S101s to the client having issued the service module acquisition request. The server registers an address of the client which had issued the service module acquisition request in the "List of client addresses for delivery" in service module data corresponding to the delivered service module in the server data management table SDT1 (step S102s).

On the other hand, the client having received the service module (more specifically, the client daemon CD1) determines whether the received service module should be registered in the client data management table CDT1 or not (step S106c). The processing in step S106c is that to be executed for requesting execution of a service module to be executed, especially execution of a common module to a server when shortage of resources is identified in system checking in step S104c or by the system monitoring thread CTH1.

When registering a service module in step S106c, if shortage of resources in the client is not identified, the service module received from the server is registered in the client data management table CDT1. When registering this module, an address of the server from which the service module has been acquired In step S102c, when the object service module has not been registered (i.e. when the service module can not be retrieved) in the client data management table CDT1, the processing in step S103 is skipped, and processing in step S104c is executed.

In step S104c, functions, processing capability of and a work load to the current client are checked by means of a system call to the operating system COS. This system check of the client can also be made by the system monitoring thread CTH1 described above. When the system monitoring thread CTH1 is used for checking the initial setting module can issue a request for acquisition of information on whether there is a shortage in resources or not to the system monitoring thread CTH1. However, herein it is assumed that system check by the initial setting module itself by using a system call is made so as to quickly check the operating state of the system.

The initial setting module determines whether it is necessary to acquire the service module extracted in step S101c from the server or not (step S105c). If it is determined in step S105c that it is necessary to acquire the service module from the server, more specifically when it is determined in step S102c that the service module has not been registered in the client data management table CDT1, or when version numbers of the service modules acquired in step S103c are different from each other, a request for acquisition of the service module is issued to the server. is registered in the "Acquired server address" in the service module data shown in FIG. 5 and the client data management table CDT1 is updated (step S107c).

When the service module is not to be registered in step S106c, namely when shortage of resources is detected in the client, the processing for shifting to an environment for execution of a module for a client described later (step S120 in FIG. 8) is executed.

After the processing for shifting to an environment for execution of a module for a client is executed, or after completion of step S107c, the processing for starting a service described below is executed.
(Service Start Processing)

Figure 11:
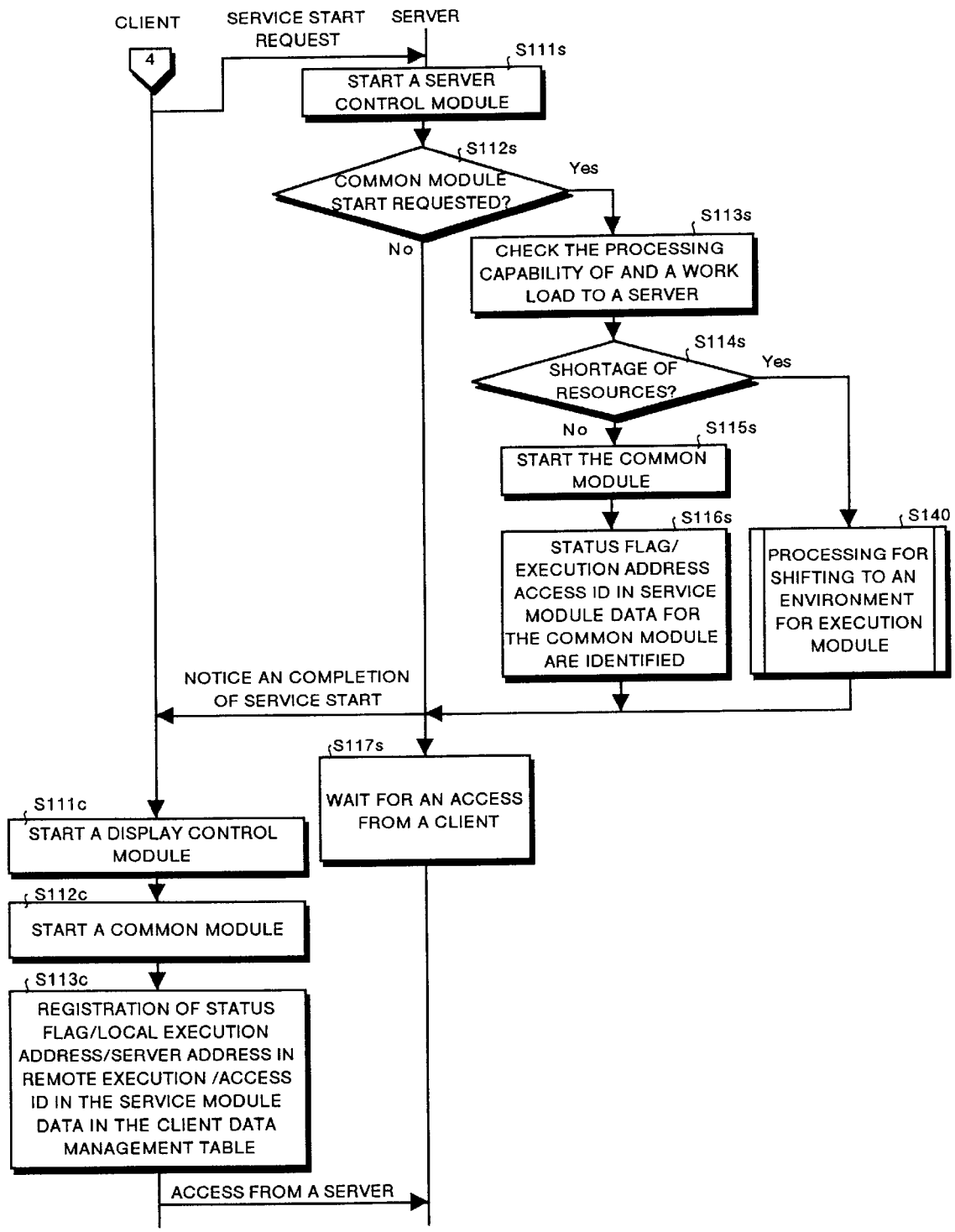
FIG. 11 is a flow chart showing processing for starting a service according to the present invention.

Next description is made for the processing for starting the service selected in step S91c shown in FIG. 9. FIG. 11 is a flow chart showing the service start processing. As shown in FIG. 11, at first the client daemon CD1 issues a request for starting a server control module for providing server control to a server in response to a request from a user for starting a service. When this request is issued, the server starts the server control module (step S111s).

If drop of processing capability of the client is remarkable or a work load to the client is excessive, namely when registration of a service module is not executed in step S106c in the "processing with the initial setting module" described above, or when shortage of resources is detected anew by the system monitoring thread CTH1, the client daemon CD1 issues a request for starting the common module, which should originally be executed in the client itself, to the server so that the common module is executed in the server.

Thus, it is required to determine whether a request for starting a common module is made or not (step S112s) in succession to the processing in step S111s. In step S112s, if it is determined that a request for starting a common module has been made, then the processing capability of and a work load to the server are checked (step S113s). Namely, the server daemon SD1 acquires information indicating a state of resources in the server from the system monitoring thread STH1.

Then, determination is made according to the information acquired in step S113s as to whether the system is short in resources or not (step S114s). When it is detected in step S114s that resources are short, the processing for shifting to an environment for execution of a module for a server (step S140) is executed so that the execution of the common module can be started in the server.

In step S114s, if shortage of resources is not detected, the server daemon SD1 starts the common module requested to be started (step S115s), and sets an execution address required for access to the common module, an access ID, and a status flag (Refer to "Server address in remote execution", "Access ID", and "Status flag" in the service module data shown in FIG. 3) (step S116s).

Then, the server daemon SD1 indicates completion of an operation for starting a service, namely an operation for starting a common module when a request for starting a server control module as well as for starting a common module, and delivers a notice of completion of the operation for starting the service including information on the execution address, access ID, and status flag set in step S116s to the client having issued the request. Then, the server daemon SD1 shifts to the client access queuing state (step S117s). This indicates that the operation for starting a service program for a server (server control module, common module) has been completed.

When the client daemon CD1 receives a notice on completion of an operation for starting a service from a server, the client daemon CD1 starts a display control module corresponding to the service to be executed (step S111c). Then the client daemon CD1 starts only the common modules, which the client daemon CD1 can execute, of those to be executed according to information on system resources in the client acquired by the system monitoring thread CTH1 or the like (step S112c).

Then the client daemon CD1 registers "Server address in local execution", "Server address in remote execution", "Access ID", "Status flag" or the like in service module data for each common modules required for execution of the service in the client data management table CDT1 (step S113c). This indicates that the operation for starting the service program for a client (display control module, common module) has been completed.

Thus, a user can access a server with the service program for a client (more specifically, access to the service program for a server), and utilize the services provided by the server.
(Processing for Shifting to an Environment for Execution of a Module in a Client)

Next, description is made for the processing for shifting to an environment for execution of a common module in the server when processing capability of or an excessive work load to a system is detected by the system monitoring thread CTH1. This processing corresponds to the processing for shifting to an environment for execution of a module in the server in step S120 in the processing by the system monitoring thread shown in FIG. 8.

Figure 12:
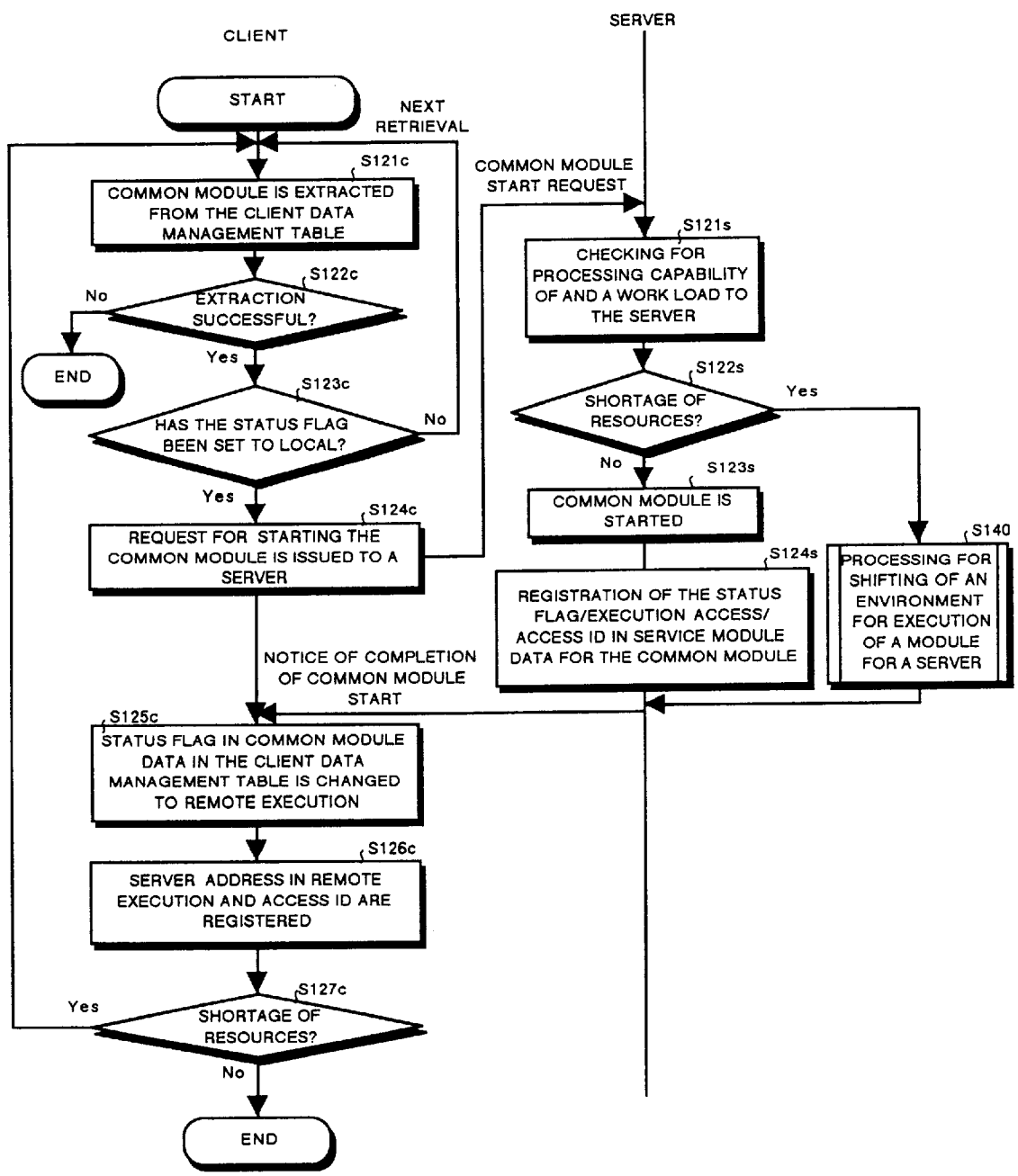
FIG. 12 is a flow chart showing processing for shifting to an environment for execution of a module in a client according to the present invention.

FIG. 12 is a flow chart showing the processing for shifting to an environment for execution of a module in a client. It should be noted that the processing for shifting to an environment for execution of a module is provided by a module execution environment shifting program previously registered in the client, and a thread for this is generated in the client daemon CD1, residing and executed in the system.

As shown in FIG. 12, at first the client daemon CD1 extracts a first common module of those currently being executed from the client data management table CDT1 (step S121c). Then the client daemon CD1 determines in step S121c as to whether the common module can be extracted or not (step S122c).

When the common module can not be extracted in step S122c, namely when a common module required for execution of a service is not registered in the client data management table CDT1, the processing for shifting to an environment for execution of a module is terminated. When the common module can be extracted in step S122c, information regarding a status flag is acquired from service module data for the extracted common module, and it is determined whether the status flag indicates "Local execution" or not (step S123c).

When the status flag does not indicate "Local execution" in step S123c, namely when the extracted common module is executed in a server, as it is not necessary to shift the environment for execution of a service module so that the system control again returns to step S121c for retrieving the next common module in the client data management table CDT1.

When the status flag indicates "Local execution" in step S123c, namely when the extracted common module is executed in the client, a request for starting the common module is issued to the server so that the common module is executed in the server (step S124c).

When the server receives the common module start request from the client, at first, the server checks the processing capability of and a work load to the server (step S121s). Namely the server daemon SD1 acquires information indicating a state of resources in the server from the system monitoring thread STH1.

Then it is determined (step S122s) whether the system is short in resources or not according to the information acquired in step S121s. When shortage of resources is detected in step S122s, the processing for shifting of an environment for execution of a module (step S140) is executed so that the common module requested to be started is executed in other server.

When shortage of resources is not detected in step S122s, the server daemon SD1 starts the common module requested to be started (step S123s), and sets an execution address required for access to the common module, an access ID, and a status flag (Refer to the "Server address in remote execution", "Access ID", and "Status flag" in the service module data shown in FIG. 3) (step S124s).

Then the server daemon SD1 indicates completion of an operation for starting the common module to the client which had issued the start request, and delivers a notice on completion of starting of the common module including the execution address, the address ID, and the status flag set in step S124s to the client.

When the client daemon CD1 receives the notice of completion of an operation for starting the common module from the server, the client daemon CD1 stops execution of the common module being executed locally, or deletes the common module program when an area for data accumulation is short. Then the client daemon CD1 changes a status flag for service module data for the object common module to "Remote execution" in the client data management table CDT1 (step S125c).

Then the client daemon CD1 registers the "Server address in remote execution", "Access ID", and "Status flag" in service module data for each common module required for execution of the service in the client data management table CD1 (step S126c).

Further, the client daemon CD1 determines, by the way of acquiring system resource information from the system monitoring thread CTH1, whether the system is short in resources (drop of the processing capability or an excessive work load) or not (step S127c). When shortage of resources is not detected in step S127c, the processing for shifting of an environment for execution of a module is terminated.

When shortage of resources is detected in step S127c, the processing in step S121c is repeated again. Namely the processing for shifting of an environment for execution of a module is repeated until shortage of resources in the system is dissolved. In the distributed processing system according to the present invention, a common module is shared by other service modules or the client daemon CD1, so that, even if a place of execution of the common module is changed, it is necessary to insure access to the common module like in a case where the place of execution is not changed.

Figure 13:
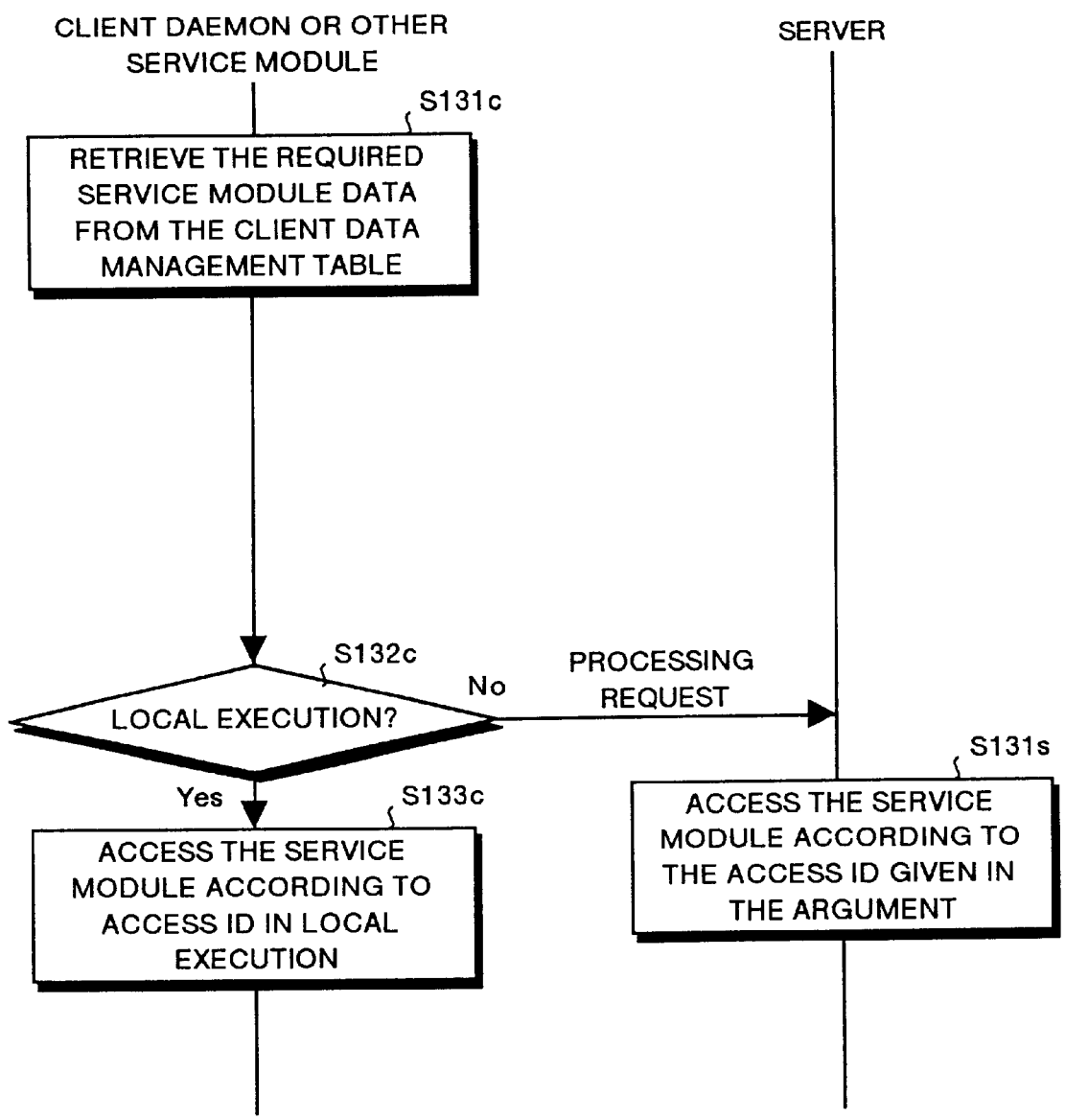
FIG. 13 is a flow chart showing a service module access processing according to the present invention.

FIG. 13 is a flow chart showing the service module access processing. The client daemon CD1 or other service module executes the service module access processing shown in FIG. 13 prior to access to a service module required for execution of a desired service. As shown in FIG. 13, at first the client daemon CD1 or the other service module retrieves service module data for the required service module (specifically, a common module herein) from the client data management table CD1 (step S131c). It is assumed herein that an operation for setting up the service module by the initial setting module described above is complete before execution of this service module access processing.

Then the client daemon CD1 or the other service module acquires information on the status flag from service module data retrieved in step S131c, and determines whether the status flag indicates the "Local execution" or not (step S132c). When it is determined in step S132c that the status flag does not indicate "local execution", namely when the status flag indicates "Remote execution", the client daemon CD1 or the other service module demand the processing for this service module to the server indicating the "Server address in remote execution" included in service module data. It should be noted that this notice of request includes information regarding the "Access ID" for accessing the required service module.

The server daemon SD1 receives the service module processing request from the client, identifies the "Access ID" as a processing object from this request, and accesses to the service module by using this "Access ID" (step S131s).

When the status flag indicates "Local execution" in step S132c, the service daemon SD1 acquired the "Access ID for local execution" from service module data for the service module and uses the access ID to access to the service module (step S133c) With the service module access processing, regardless of whether the place of execution of the common module is in the client or in the server, the other service module or the client daemon CD1 is no affected. Further, the place of execution of the common module is defined by the "Server address in remote execution" and "Access ID", so that the server for remote execution is not limited to the server from which the client acquires the common module.

(Processing for Shifting of an Environment for Execution of a Module in a Client)

Next, description is made for the processing for shifting of an environment for execution of a module to another server when drop of processing capability of or a work load to a system is detected in a server by the system monitoring thread STH1. This processing corresponds to the processing for shifting of an environment for execution of a module for a server in step S140 in the processing by the system monitoring thread shown in FIG. 8.

Figure 14:
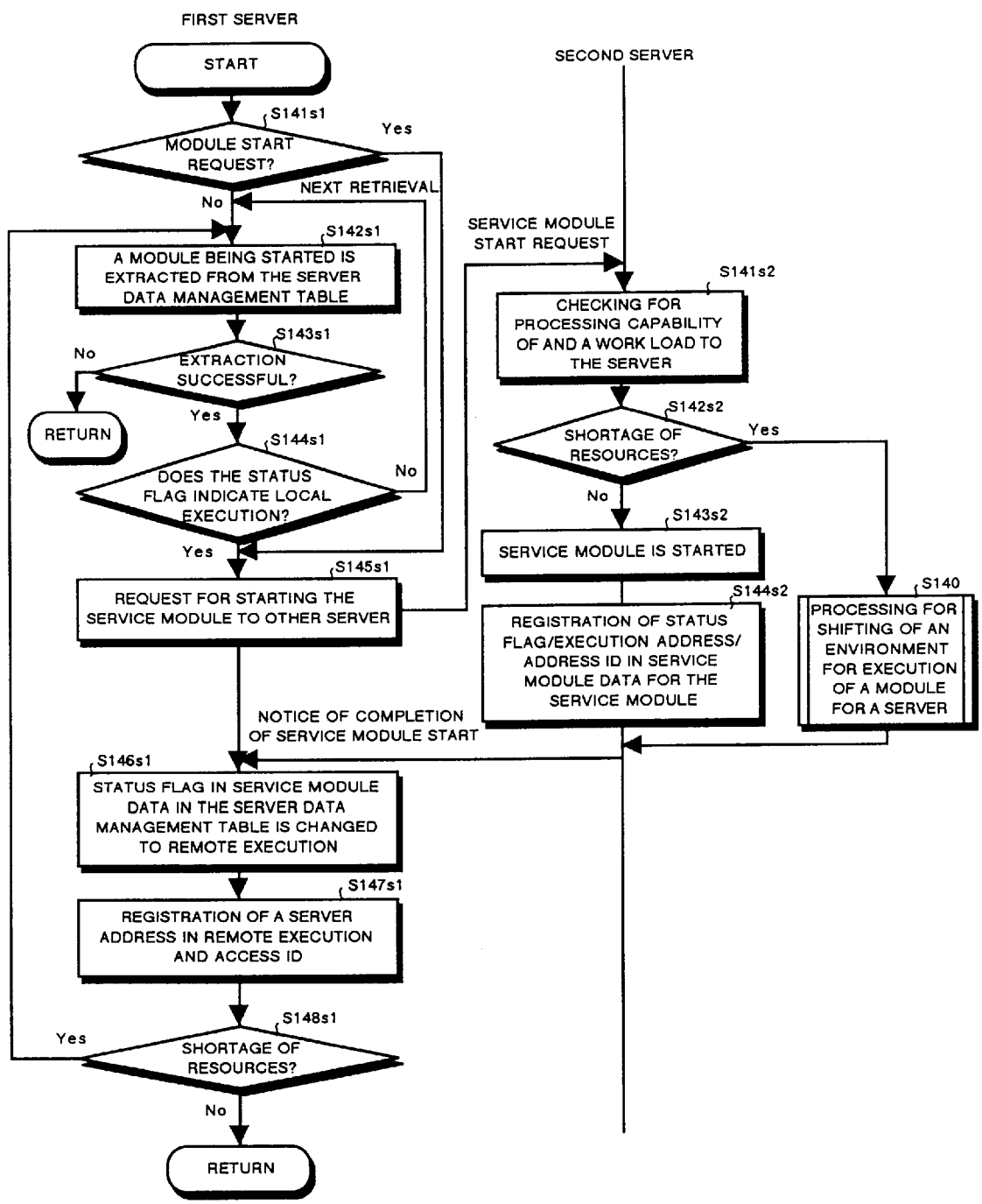
FIG. 14 is a flow chart showing module executing environment shifting processing in a server according to the present invention.

FIG. 14 is a flow chart showing the processing for shifting of an environment for execution of a module in a server. This processing for shifting of an environment for execution of a module is provided by a module execution environment shifting program previously registered in the server, and the thread is generated and resides in the server daemon SD1, and is executed therein.

As shown in FIG. 14, at first the system daemon SD1 determines whether a request for starting the service module has been generated to this server or not (step S141s1). When it is determined in step S141s1 that the request for starting the service module has not been generated, a first service module of those being currently executed is extracted from the server data management table SDT1 (step S142s1). Then, the server daemon SD1 determines whether the service module could be extracted in step S142s1 or not (step S143s1).

When the service module could not be extracted in step S143s1, namely when the service module required for execution of a service has not been registered in the server data management table SDT1, the processing for shifting of an environment for execution of a module is terminated. On the other hand, when the service module could be extracted in step S143s1, information on the status flag is acquired from service module data for the extracted service module, and it is determined whether this status flag indicates "Local execution" or not (step S144s1).

When the status flag does not indicate "Local execution" in step S144s1, namely when the extracted service module is being executed in some other server, it is not necessary to shift the environment for execution of the service module. Therefore, the system control again returns to step S142s1 to search for the next service module in the server data management table SDT1.

When the status flag indicates "Local execution" in step S144s1, namely when the extracted service module is being executed in this server (first server), a service module start request is issued to the other server (second server) so that the service module is executed in that server (step S145s1).

When the other server receives the service module start request from the server described above, at first this other server checks processing capability of or a work load to the server (step S141s2). Namely a server daemon in the second server acquired information concerning resources in the second server from a system monitoring thread in the second server.

Then it is determined whether resources in the system are short or not (step S142s2) according to the information acquired in step S141s2. When shortage of resources is detected in step S142s2, processing for shifting of an environment for execution for a module for a server for requesting execution of the service module requested to be started in still another server (third server), namely the processing for shifting of an environment for execution for a module to this module is recursively executed in the third server.

When shortage of resources is not detected in step S142s2, a server daemon in the second server starts the service module requested to be started (step S143s2), and sets an execution address, an access ID, and a status flag each required for access to the service module (Refer to the "Server address for remote execution", "Access ID", and "Status flag" shown in FIG. 3).

Then the server daemon delivers a notice on completion of service module start indicating completion of an operation for starting the service module and including the execution address, access ID, and status flag set in step S144s2 to the first server which had issued the start request.

When the server daemon SD1 in the first server receives the notice on completion of service module start from the second server or from any other server, the server daemon SD1 stops execution of the service module being currently executed. Then the server daemon SD1 in the first server changes the status flag for service module data for an object service module to "Remote execution" in the server data management table SDT1 (step S146s1).

Then the server daemon SD1 in the first server registers "Server address for remote execution", "Access ID", and "Status flag" in service module data for each of service modules required for execution of a service in the server data management table SDT1 (step S147s1).

Further the server daemon SD1 in the first server determines whether system resources are short (drop of processing capability or excessive work load) or not by acquiring information on system resources from the system monitoring thread STH1 (step S148s1). When shortage of resources is not detected in step S148s1, this processing for shifting of an environment for execution for a module is terminated.

When shortage of resources is detected in step S148s1, the processing in step S142s1 is repeated again. Namely this processing for shifting of an environment for execution for a module is repeated until shortage of system resources is dissolved. Thus, even when the place of execution of the service module is changed by executing the processing for shifting of an environment for execution for a module in a server described above, access to the service module is insured by the service module access processing shown in FIG. 13.

(Service Module Update Processing)

Next, description is made for the processing executed by the server daemon SD1 for automatically requesting updating and registration of the service module when a service module registered in a server is changed.

Figure 15:
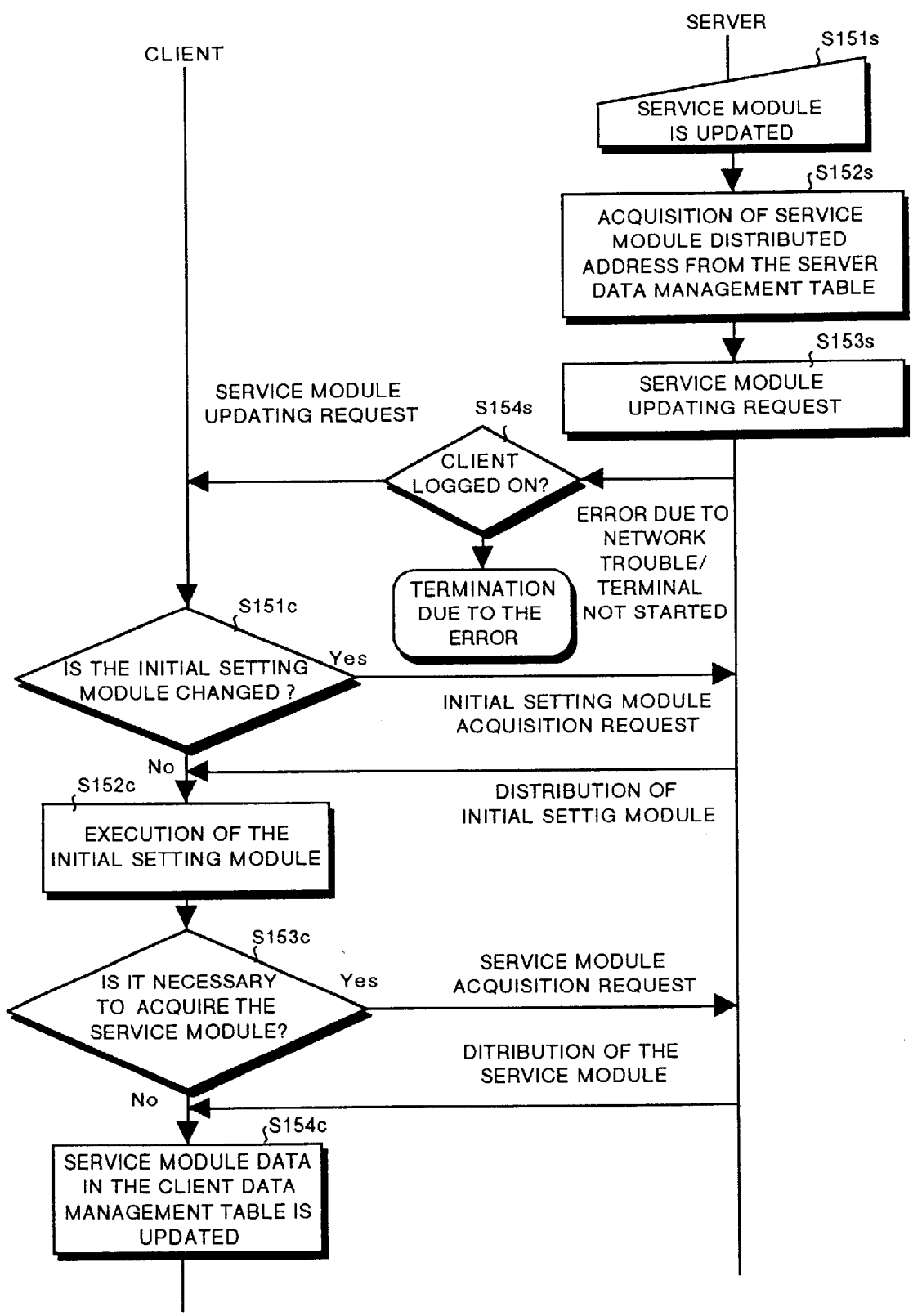
FIG. 15 is a flow chart showing a service module updating processing according to the present invention.

FIG. 15 is a flow chart showing the service module updating processing. As shown in FIG. 15, at first, a service module registered in a server is updated by a system manager or some other person (step S151s). Then a "List of client addresses for delivery" is acquired from service module data for the service module to be updated in the server data management table SDT1 according to an instruction from the system manager or some other person or with the server daemon SD1 (step S152s).

Then a service module updating request as a notice of updating of the service module is delivered to the client represented in the "List of client addresses for delivery" acquired in step S152s (step S153s). Information on a version number of the initial setting module corresponding to the client as an object for delivery is included in this service module updating request.

Then the server daemon SD1 checks whether the client as an object for delivery has logged on the network or not (step S154s). When it is impossible to confirm whether the client has logged on or not due to some network problem or because the terminal has not been started, delivery of the service module updating request to the client is terminated as an error and skipped, and checking whether a client is logged on or not is repeated with respect to some other client as an object for delivery. The server daemon SD1 executes log-on check periodically to the client to which the service module updating request was not delivered because of termination due to an error to retry delivery of the service module updating request to the client.

On the other hand, the client daemon CD1 having received the service module updating request acquires information on a version number from service module data for the initial setting module in the client management data table CDT1, compares the information to information on a version number for the initial setting module included in the version number, and determines whether the initial setting module is to be changed or not (step S151c).

In step S151c, when it is determined that the initial setting module is to be changed, namely when a version number of the initial setting module registered in the client management data cable CDT1 is newer as compared to that of the initial setting module included in the service module updating request, a request for acquiring the initial setting module is issued to the server. It should be noted that the initial setting module acquisition request includes a service name for a target initial setting module and numerical information identifying a platform type (client type) indicating hardware specifications of or an operating system for the client.

A server identifies the service name and type of the client according to numerical information indicated by the initial setting module acquisition request received from the client, and select an initial setting module corresponding to the service name and client type identified as described above from the server data management table STD1. Then the server delivers the selected initial setting module to the client having issued the initial setting module acquisition request. The server delivers the initial setting module and then registers the address of the client having issued the initial setting module acquisition request in the "List of client addresses for delivery" of the service module data for the delivered initial setting module.

The client daemon CD1 acquires the initial setting module from a server and then registers the initial setting module in the client data management table CDT1. Then the client daemon CD1 registers the initial setting module in the client data management table CDT1 and then executes the initial setting module when change of the initial module is not required in step S151c (step S152c).

Then the client daemon CD1 determines whether it is necessary to acquire a service module defined in the initial setting module from a server or not (step S153c). When it is determined in step S153c that it is necessary to acquire a service module from a server, more specifically when the service module has not been registered in the client data management table CDT1, or when information on a version number is old, then a service module acquisition request is transmitted to the server.

The server identifies a service module according to the information included in the service module request received from the client, and selects the identified service module from the server data management table SDT1. Then the server delivers the selected service module to the client which had issued the service module acquisition request. The server registers, after delivery of the service module, an address of the client having issued the service module acquisition request in the "List of client addresses for delivery" of the service module data corresponding to the delivered service module.

On the other hand, the client having received the service module registers the service module received from the server in the client data management table CDT1 (step S154c). While registering the service module, the address of the server from which the client received the service module is registered in the "Acquired server address" in the service module data shown in FIG. 5. Because of this service module updating processing, a user can always make use of an up-to-data service module without being aware of the necessity of updating of a service module.

It should be noted that the service module updating processing described above is executed, for instance, by previously registering a service module for execution of the service module updating processing.

Detailed description is made hereinafter for the embodiments of the distributed processing system according to the present invention, which system operates based on the series of operations described above.

FIG. 16 is an explanatory view showing a system configuration of the distributed processing system according to Embodiment 1 of the present invention in a state when a service is not started. As shown in FIG. 16, the distributed processing system according to Embodiment 1 comprises a Server #1 which provides services as a server and a Client #1 which receives the service as a client connected through a network and a common communication interface to each other.

In reality the distributed processing system according to the present invention comprises a number of servers and a number of clients connected to each other through a network, however, herein description is made for processing executed between one server and one client.

It is assumed herein that the logical address of the Server #1 on the network is #0001 and the logical address of the Client #1 on the network is #0011. The Server #1 has a server daemon SD1 for receiving a request for connected from a client, and a server data management table SDT1 for management of the service data. It is also assumed in this figure that the Server #1 is in a state where the server daemon shown in FIG. 7 has been started, and is ready for an access from a client or some other server. Therefore, a system monitoring thread STH1 for management of processing capability of and a work load to the client has been generated in the server daemon SD1.

The Client #1 has a client daemon CD1 for communicating with the Server #1 and providing an interface to a user, and a client data management table CDT1 for management of the service data acquired from a server. It is assumed herein that the client daemon shown in FIG. 6 has been started and is ready for access from a user or from some other server. Therefore, a system monitoring thread CTH1 for management of processing capability and a work load to the client has been generated.

Both the Server #1 and the Client #1 operates in an environment for execution of an operating system OS, and execute data input/output to and from a network through a communication socket API. As described above, because the Server #1 and the Client #1 have a common communication interface, it is not always necessary to use the same operating system for both the Server #1 and the Client #1.

Figure 17:
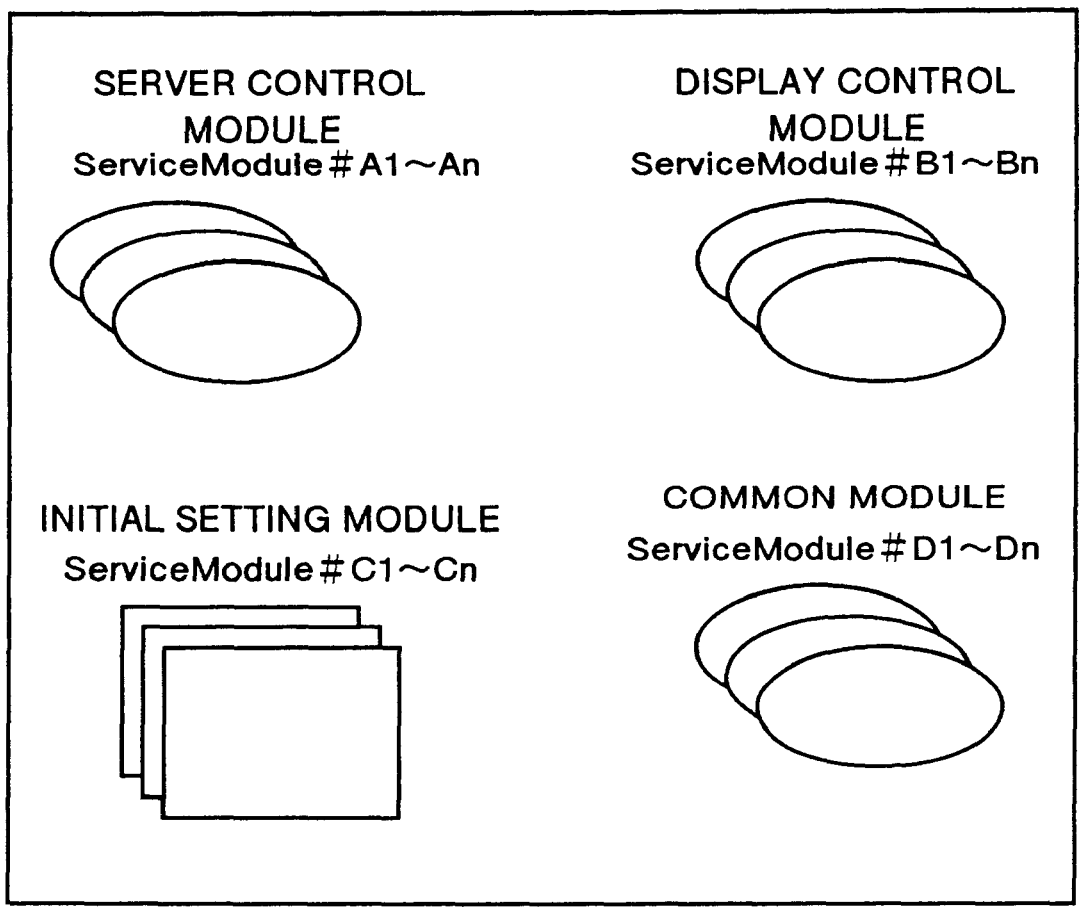
FIG. 17 is an explanatory view showing service data required for execution of Service #1 in Embodiment 1.

Description is made hereinafter assuming a case in which a Service #1 is executed as one of the services provided by the server. FIG. 17 is an explanatory view showing service data required for execution of the Service #1. Namely, a service program for the server and a service program for the client comprise a combination of service modules included in the service data respectively.

As shown in FIG. 17, service data Service #1 comprises a plurality of service modules, and more specifically the service data Service #1 comprises server control modules ServiceModules #A1 to #An each executed in a server and providing service controls, display control modules ServiceModules #B1 to #Bn each executed in the client and providing controls over GUI display or communications with a server, initial setting modules ServiceModules #C1 to #Cn each executed in a client with a method of acquiring a module required for execution of a service or a method of checking processing capability of or a work load to the system defined therein, and common modules ServiceModules #D1 to #Dn operable in both the environments i.e. the environment for the service and environment for the client. A required number of service modules are prepared according to a type of a client or contents of a service to be provided.

In the state as shown in FIG. 16 i.e. in the state in which the Server #1 and the Client #1 have not started the service therein, at first a user selects a desired service from a service list displayed on a display unit of the Client #1 by executing the client daemon start processing shown in FIG. 6. When a service is selected, the initial setting module acquisition processing shown in FIG. 9 is executed, and an initial setting module acquisition request is issued to the Server #1. It is assumed herein that no initial setting module required for execution of the selected service, or the display control module, or the common module have been registered in the client data management table of the Client #1.

Then the Server #1 returns the initial setting module ServiceModule #C1 corresponding to a client type of Client #1 to the Client #1. The Client #1 receives this initial setting module ServiceModule #C1 from the Server #1, and starts the initial setting module ServiceModule #C1. When this initial setting module ServiceModule #C1 is started then the initial setting module processing shown in FIG. 10 is executed and the display control module ServiceModule #B1 required for execution of the Service #1 and common module ServiceModule #D1 are acquired from contents defined in the initial setting module ServiceModule #C1.

The common module ServiceModule #D2 is required in the Client #1 in order to execute the Service #1. However, it is assumed herein that, a shortage of resources is detected by the system monitoring thread CTH1 in Client #1, so that acquisition and start of the common module ServiceModule #D2 are not executed, and start of the common module ServiceModule #D2 is requested to Server #1.

The Client #1 sends a request for starting the Service #1 to the Server #1, and the service start processing shown in FIG. 11 is executed. While executing the service start processing, the Server #1 starts the common module ServiceModule #D2 requested to be started from the Client #1, and then shifts to a state for waiting for access from a client.

Then the display control module ServiceModule #B1 and common module ServiceModule #D1 are started in the Client #1 with which the operation for starting the Service #1 completed.

FIG. 18 is an explanatory view showing a system configuration of the distributed processing system according to Embodiment 1 after a service has been started. As shown in FIG. 18, the Server #1 has the server control module ServiceModule #A1 and the common module ServiceModule #D2 each as a service program for the server for providing the Service #1 in addition to the configuration shown in FIG. 17, and a thread is generated in the server daemon SD1 when these service modules are executed.

The Client #1 has the display control module ServiceModule #B1, the initial setting module ServiceModule #C1, and the common module ServiceModule #D1 each as a service program for the client for providing the Service #1 in addition to the configuration shown in FIG. 17, and a thread is generated in the client daemon CD1 when these service modules are executed.

Next description is made for service module data for the Server #1 when the Server #1 delivers an initial setting module to a client in the initial setting module acquisition processing shown in FIG. 9. Herein description is made especially for a case in which the Server #1 delivers the initial setting module ServiceModule #C1 to a plurality of clients (Client #1, Client #2, and Client #3).

FIG. 19 is an explanatory view showing service module data for the initial setting module ServiceModule #C1 registered in the server data management table SDT1 for the Server #1. In FIG. 19, at first "ServiceModule #C1" is registered as a "Service module name", and also "Service #1" is registered as a "Default service name". Then in the "List of client address for delivery", logical addresses (#0011, #0012, #0013) of the plurality of clients Client #1, Client #2, Client #3 on the network are registered.

"3" which is a code indicating an initial setting module as a "Module type" is registered, and as a "Platform type", code "1" identifying specific hardware specifications of or an operating system for the Client #1 is registered.

Further "1" is registered as the "Version number", and when the initial setting module ServiceModule #C1 is updated, this "Version number" is updated, and the service module updating processing shown in FIG. 15 is executed. Herein the service module updating processing to the initial setting module ServiceModule #C1 is automatically executed to all of the Client #1, Client #2, and Client #3 registered in the "List of client address for delivery" without requiring intervention by a user.

Next description is made for service module data for the common module ServiceModule #D1 as an example of service module data to be registered in the client data management table CD1 for the Client #1.

FIG. 20 is an explanatory view showing service module data for the common module ServiceModule #D1 registered in the client data management table CD1 for the Client #1 in this case. As shown in FIG. 20, at first "ServiceModule #D1" is registered as the "Service module name", and "Service #1" is registered as the "Default service name". Then "1" is registered as the "Version number", and further "#0001" indicating a logical address of a server having delivered the common module ServiceModule #D1 is registered as the "Acquired server address".

Further local execution, namely "1" indicating execution of the common module ServiceModule #D1 in the Client #1 is registered as the "Status flag", and the access ID "111" required for access to this common module ServiceModule #D1 is registered as the "Access ID in local execution".

Description is made for service module data for the Server #1 as well as for the Client #1 in a case when drop of processing capability or an excessive work load is detected in the processing with the system monitoring thread shown in FIG. 8 and the service module access processing shown in FIG. 13 is executed. Herein description is made assuming a case in which an excessive work load is detected in the Client #1 in the state shown in FIG. 18 and the Client #1 requests execution of the common module ServiceModule #D1 to the Server #1.

FIG. 21 is an explanatory view showing a system configuration of the distributed processing system according to Embodiment 1 after start of a service, and more specifically shows the state in which the common module ServiceModule #D1 requested from the Client #1 has been stated by the Server #1. In this case, as shown in FIG. 21, the Client #1 releases the common module ServiceModule #D1 from a service program for the client, and the Server #1 starts the common module ServiceModule #D1.

When the common module ServiceModule #D1 is started in the Server #1, service module data for the common module ServiceModule #D1 in the server data management table SDT1 is changed. FIG. 22 is an explanatory view showing the service module data for the common module ServiceModule #D1 registered in the server data management table SDT1 for the Server #1 in this case.

As shown in FIG. 22, at first "ServiceModule #D1" is registered as the "Service module name", and "Service #1" is registered as the "Default service name". Then "#0011", which is a logical address for the Client #1 is registered in the "List of client address for delivery".

Also "4", which is a code indicating a common module, is registered as the "Module type", and "0" which indicates that a server, a client, hardware specifications, or an operating system is not specified is registered as the "Platform type".

Further "1" is registered as the "Version number", and local execution is registered and the "Status flag", and "1", which indicates execution of the common module Service-Module #D1 in the Server #1 is registered. In addition, the access ID "222" required for access to this common module ServiceModule #D1 is registered as the "Access ID in local execution".

On the other hand, in Client #1, when execution of a module in the Server #1 is complete, service module data for the common module ServiceModule #D1 in the client data management table CDT1 is changed. FIG. 23 is an explanatory view showing service module data for the common module ServiceModule #D1 registered in the client data management table CDT1 for the Client #1 in this case.

As shown in FIG. 23, at first "ServiceModule #D1" is registered as the "Service module name", and "Service #1" is registered as the "Default service name". Further "1" is registered as the "Version number", and "#0001" indicating a logical address of the server having delivered this common module ServiceModule #D1 is registered as the "Acquired server address".

Further, as the "Status flag", remote execution, namely "2", which is code indicating execution of the server module ServiceModule #D1 by a server, is registered. Further, as the "Server address in remote execution", "#0001" indicating an address of the Server #1 starting this common module ServiceModule #D1 is registered, and further the access ID "222" required for access to the common module Service-Module #D1 on the Server #1 is registered as the "Access ID".

As described above, with the distributed processing system according to Embodiment 1 of the present invention, even if clients each based on different hardware specification or running on a different operating system are connected to a network, by executing the client daemon start processing, the server daemon start processing, the initial setting module acquisition processing, the initial setting module processing, and the service start processing each described above, any client can use any service provided by a server only by means of acquiring an initial setting module according to each client. Further, as the required initial setting module can automatically be acquired with a service utilizing unit in each client, a user can easily make use of any service provided from the server without requiring any knowledge concerning module configuration required for utilization of the service.

Further, by executing the processing with a system monitoring thread and processing for shifting of an environment for execution of a module in a client described above, when drop of processing capability is detected in the client, a portion of common modules being executed on the client can be started in a server, so that drop of throughput due to shortage of resources in a client can quickly be evaded with effective work distribution realized.

Further, by executing the service module updating processing, a user who is using the client is not required to be aware of a period for updating a module in a server, and quick processing for updating a module can be carried out in the client.

Next description is made for a case in which a request for starting the common module ServiceModule #D2 is executed in the Server #2 which is a different server due to the shortage of resources in the Server #1 in the state corresponding to contents of registration of service module data shown in FIG. 19 and FIG. 20 described in Embodiment 1 above, namely in a state in which the Client #1 has issued a request for starting the common module ServiceModule #D2 to the Server #1 (in the state shown in FIG. 18).

Figure 24:
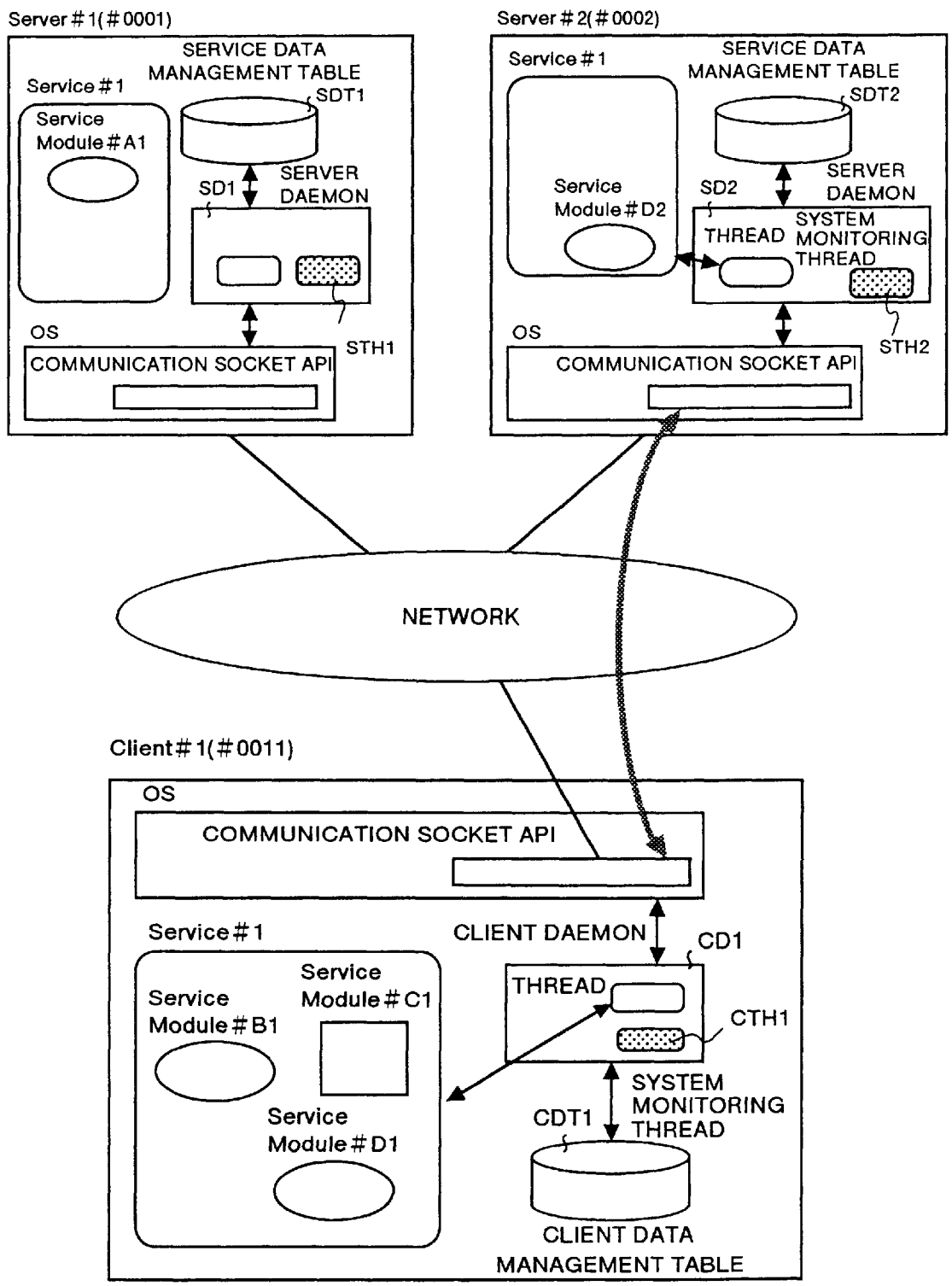
FIG. 24 is an explanatory view showing system configuration when a service in a distributed processing system according to Embodiment 2 of the present invention has been started.

FIG. 24 is an explanatory view showing a system configuration of a distributed processing system according to Embodiment 2 of the present invention when a service is started. As shown in FIG. 24, the distributed processing system according to Embodiment 2 comprises a Server #1 and a Server #2 each as a server capable of providing a Service #1 and a Client #1 receiving this Service #1 as a client. The Server #1, Server #2 and the Client #1 have a common communication interface.

In reality the distributed processing system according to the present invention comprises a number of servers and a number of clients, however, description is made herein assuming a case in which two servers and one client are connected to each other through the network.

It is assumed herein that the logical addresses of the Server #1 and the Server #2 on a network are #0001 and #0002 respectively and that the logical address of the Client #1 on the network is #0011. The Server #1 and the Server #2 both are in the state in which the service start processing shown in FIG. 11 is executed, and especially the Server #1 is in the state in which the processing for shifting of an environment for execution of a module shown in FIG. 14 has been executed due to detection of a shortage in resources by the system monitoring thread processing shown in FIG. 8.

Herein the second server in the processing for shifting of an environment for execution of a module shown in FIG. 14 corresponds to the Server #2, and the common module ServiceModule #D2 having been requested to be started from the Client #1 is started by this Server #2. Thus, as shown in FIG. 24, in the Server #2, the common module ServiceModule #D2 is prepared as a service program for a server providing the Service #1, and a thread is generated in the server daemon SD2 when this service module is executed.

On the other hand, the Client #1 is in the state described in Embodiment 1 and shown in FIG. 18, and the display control module ServiceModule #B1, the initial setting module ServiceModule #C1, and the common module ServiceModule #D1 are prepared each as a service program for a client to which the Service #1 is provided, and a thread is generated in the client daemon CD1 when these service modules are executed.

The Server #1, Server #2, and the Client #1 operate in- an environment for execution of the operating system OS, and execute data input/output to and from a network via the communication socket API. Herein, as described above, because the Server #1, Server #2, and the Client #1 have a common communication interface, the operating system OS in them is not always required to be identical.

Next, description is made for service module data for the Server #1 and the Client #1 in the state shown in FIG. 24. It is especially assumed herein that a request for execution of the common module ServiceModule #D2 has been issued from the Client #1 to the Server #1, and further that the Server #1 has issued a request for execution of the common module ServiceModule #D2 to the Server #2.

FIG. 25 is an explanatory view showing service module data for the common module ServiceModule #D2 registered in the server data management table SDT1 for the Server #1 in this case.

As shown in FIG. 25, "ServiceModule #D2" is registered as the "Service module name", and "Service #1" is registered as the "Default service name". A code indicating a common i.e. "4" is registered as the "Module type", and "0" which indicates that a server, a client, hardware specifications, or an operating system is not specified is registered as the "Platform type".

Further, "1" is registered as the "Version number", and "2", which is a code indicating remote execution, namely execution of the common module ServiceModule #D2 by a server other than the Server #1 is registered as the "Status flag". As the "Server address in remote execution", "#0002" indicating the address of the Server #2 which is a server starting this common module ServiceModule #D2 is registered, and access ID "333" required for access to the common module ServiceModule #D2 on this Server #2 is registered as the "Access ID".

FIG. 26 is an explanatory view showing service module data for the common module ServiceModule #D1 registered in the client data management table CDT1 for the Client #1 in this case.

As shown in FIG. 26, "ServiceModule #D1" is registered as the "Service module name", and "Service #1" is registered as the "Default service name". Further "1" is registered as the "Version number", and "#0001" indicating a logical address of a server having delivered this common module ServiceModule #D2 is registered as the "Acquired server address".

Further as the "Status flag", "2" indicating remote execution, namely execution of the common module ServiceModules #D2 by a server is registered. Then "#0002" indicating the address of Server #2 which is a server starting the common module ServiceModule #D2 is registered as the "Server address in remote execution" is registered, and access ID "333" required for access to the common module ServiceModule #D2 on this Server #2 is registered as the "Access ID".

As described above, with the distributed processing system according to Embodiment 2, when resources on a server are short due to execution of the "processing for shifting of an environment for execution of a module in a server", a portion of the common modules being executed on a server are started on other server in which the resources are still not short, so that drop of throughput due to shortage of resources in a server can quickly be executed and effective distribution of a work load can be realized.

With Embodiment 1 and Embodiment 2 described above, by providing the server data management table SDT1 and the client data management table CDT1 each having service module data in which attributes (such as a service module name, the default service name, and a version number) of a service module delivered from a server to a client or a state of execution (status flag) can be registered and set in the server and the client respectively, a place of execution of a service module required for execution of a service can accurately be controlled, and access to a common module can be made without fail by executing the "service module access processing" described above.

By storing a program (more specifically a group of modules each operable discretely) for execution of the processing shown in FIG. 6 to FIG. 15 in a recording medium such as an IC card memory, a floppy disk, a electro-photo-magnetic disk, or a CD-ROM and installing the program stored in this recording medium in a server device as well as in a client device, it is possible to use the distributed processing system and also to construct the distributed processing system. It should be noted that the installing work described above may be made through a communication line from the server to the client, or by downloading between servers.

As described above, in the distributed processing system and distributed processing method each according to the present invention, a server delivers an initial setting module capable of acquiring a module different for each client and required for execution of a service from a server according to a request of the client, and the client can acquire only the required service modules from the server and make use of the service by acquiring the initial setting module from the server and executing the initial setting module. Therefore, even if clients each based on different hardware specifications or running on a different operating system are connected to the network, each client can utilize any service provided from the server only by acquiring the initial setting module according to the client regardless of differences in hardware specifications or operating system. Further, each client can automatically acquire a required initial setting module with the service utilizing unit, so that a user can easily make use of the services provided by the server without being required to be aware of a type of the client device. Then with the recording medium according to the present invention, the distributed processing according to the present invention can be applied in a computer used as a server or a client; whereby it becomes possible to construct the distributed processing system according to the present invention.

In the distributed processing system and distributed processing method each according to the present invention, a server comprises a common module which can run in any environment for execution, so that, when resources in the server are short, a place of execution of the common module which should originally be executed in the server can be shifted to another server. Thus, for instance, during execution of a service program, when resources in the server become short because of simultaneous access by many clients to the server, the common module which should have been executed by the server can be executed in another server in which resources are still not short, and drop of throughput due to shortage of resources in a server can be evaded. Then with the recording medium according to the present invention, the distributed processing according to the present invention can be applied in a computer used as a server or a client; whereby it becomes possible to construct the distributed processing system according to the present invention.

In the distributed processing system and distributed processing method each according to the present invention, a common module which can be executed in the server's environment or in the client's environment is provided, so that, when resources in the client become short, the place of execution of the common module to be originally executed in the client can be shifted to the server. Thus, for instance, when resources in a client become short during execution of a service program due to execution of other application program or the like, the common module which should have originally be executed in the client can be executed in the server, and drop of throughput due to shortage of resources in a client can be prevented. Then with the recording medium according to the present invention, the distributed processing according to the present invention can be applied in a computer used as a server device or a client device; whereby it becomes possible to construct the distributed processing system according to the present invention.

In the distributed processing system and distributed processing method each according to the present invention, a server can notify a client of updating of a service module, and the notice is given to any client to which the service program was delivered in the past. Thus, the user of the client is not required to be aware of a period of updating of the module especially in the server, and at the same time efficient processing for updating a service module is possible. With the recording medium according to the present invention, the distributed processing according to the present invention can be applied in a computer used as a server device or a client device; whereby it becomes possible to construct the distributed processing system according to the present invention.

In the present invention, a server delivers an initial setting module enabling delivery of a service module different for a type of each client. When it is necessary to change a service module required for a service program for utilizing a service in a client, the requirement can be satisfied only by changing the contents of the initial setting module. Thus, there is provided the advantage that it is possible to obtain a server in which management of a number of modules present for each client type becomes easy.

In the present invention, a common module operable in an environment for execution is provided in a server, and when resources in the server become short, a place of execution of the common module which should originally have been executed in the server can be shifted to another server. When resources in a server become short, a common module which should have originally be executed in the server can be executed in another server in which resources are still not short. Thus, there is provided the advantage that it is possible to obtain a server device in which drop of throughput of a server can be prevented.

In the present invention, of a plurality of common modules, only the common modules required to dissolve shortage of resources are shifted to other servers for execution therein. Thus, there is provided the advantage that it is possible to obtain a server in which an excessive work load to resources in servers to be started can be prevented.

In the present invention, access to a common module requested to start can directly be made not only by a server which had issued the request, but also by all clients requiring execution of the common module. Thus, there is provided the advantage that it is possible to obtain a server in which shared use of a common module requested to start can easily be realized.

In the present invention, a place of execution of a common module is managed with a module execution place table. Thus, there is provided the advantage that it is possible to obtain a server in which access to a desired common module can easily be made by referring to this module execution place table.

In the present invention, updating of a service module is notified only to clients requiring acquisition of an updated service module by referring to a module delivery destination table. Thus, there is provided the advantage that it is possible to obtain a serer device in which efficient processing for updating a service module can be made.

In the present invention, a client can acquire only service modules required in the client by acquiring an initial setting module from a server with a service utilizing unit and executing the initial setting module. Thus, there is provided the advantage that it is possible to obtain a server in which, even when clients each based on different specifications or running on a different operating system are connected to a network, each client can make use of any service provided from the server regardless of difference in specifications or operation system, and a user can easily make use of any services provided by the server without being required to be aware of a type of the client.

In the present invention, a mechanism for checking the functions and processing capability of a client is provided in a service utilizing unit executed in the client, and a service module to be acquired from a server can be selected according to a result of checking acquired by executing this checking mechanism when the initial setting module is executed. When a result of this checking indicates drop of processing capability of a client then only the service modules that can be executed in the client are acquired and executed and while execution of other service modules required for using the service can be requested to other servers. Thus, there is provided the advantage that it is possible to obtain a client in which smooth utilization of services is possible in a client.

In the present invention, when a service module required for using the service is not registered in a client data management table, the service module is acquired from the server and is registered in the client data management table. Thus, there is provided the advantage that it is possible to obtain a client in which only a minimum number of required service modules can be stored in a attached storage device and effective utilization of resources in a client can be realized.

In the present invention, when resources in a client become short during execution of a common module operable in any environment for execution client, the place of execution of the common module which should have originally been executed in the client can be shifted to the server. When shortage of resources occurs in the client, a common module which should have originally be executed in the client can be executed by the server in which resources thereof are still not short. Thus, there is provided the advantage that it is possible to obtain a client in which drop of throughput in a client can be prevented.

In the present invention, of a plurality of common modules being executed, only the common modules required for dissolving shortage of resources can be started in a server. Thus, there is provided the advantage that it is possible to obtain a client in which an excessive work load to resources in a server to be started can be prevented.

In the present invention, a place of execution of a common module can be managed with a module execution place table. Thus, there is provided the advantage that it is possible to obtain a client in which access to a desired common module can easily be made by referring to this module execution place table.

In the present invention, when updating of server module is notified from a server, the updated service module is acquired with an updated module acquiring unit. Thus, there is provided the advantage that it is possible to obtain a client in which a user is not required to be aware of a period of updating of the module in the server and at the same time efficient processing for updating a service module is possible.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A distributed processing system comprising:
   at least one server device and at least one client device connected to each other through a network, wherein said server device having, a plurality of service modules, each service module individually executable and a component of a distributed service program to be executed in the client device as a server service;

a common module as a type of the service modules executable in both operating environments of the server device and the client device;

an initial setting module enabling the client device to acquire at least one of the service modules required for the client device to execute the distributed service program as the server service; and a service providing unit providing the at least one service module in response to a client device request to acquire the at least one service module when the client device executes the initial setting module; and said client device having, the distributed service program common module executable in both operating environments of the server device and the client device; and a service utilizing unit utilizing the server service by retrieving and executing the initial setting module to acquire and execute the at least one service module, including the common module, of the distributed service program, wherein the service utilizing unit requests the server device to start operating the common module at the server device, when a shortage of resources occurs at the client device due to a lowering of a processing capacity or an increase in work load during execution of the common module in the client device.

2. The distributed processing system according to claim 1, wherein the service providing unit in the server device requests start of operations of the common module in another server device having similar functions to the server, when a shortage of resources occurs due to a lowering of processing capacity or an increase in work load during execution of the common module in the server device.

3. The distributed processing system according to claim 1, wherein the server device further comprises an update reporter reporting updating of the at least one service module to the client device to which the at least one service module was delivered by the service providing unit, when the at least one service module is updated; and the client device further comprises an updated module acquiring unit acquiring the updated service module from the server device, when the updating of the at least one service module is reported by the server device.

4. A distributed processing method for a distributed processing system having at least one server device and at least one client device connected to each other through a network, said method comprising:

delivering an initial setting module from the server device in response to a request by the client device to acquire service modules, including a common module executable in both operating environments of the server device and the client device, required for using a distributed service program as a server service provided by the server device to the client device;

executing the initial setting module in the client device and acquiring the required service modules of the distributed service program from the server device;

executing the acquired service modules, including the common module, of the distributed service program in the client device to utilize the server service; and requesting the server device to start operating the common module at the server device, when a shortage of resources occurs at the client device due to a lowering of a processing capacity or an increase in work load during execution of the common module in the client device.

5. A distributed processing method for a distributed processing system having at least one server device and at least one client device connected to each other through a network, said method comprising:

delivering an initial setting module from the server device in response to a request by the client device to acquire service modules, including a common module executable in both operating environments of the server device and the client device, required for using a distributed service program as a server service provided by the server device to the client device;

acquiring the required service modules of the distributed service program from the server device by executing the initial setting module in the client device;

registering in the server device, when the server device delivers the required service modules to the client device, an address of the client device as a delivery destination of the delivered service modules, in a module delivery destination table;

executing the acquired service modules, including the common module, of the distributed service program in the client device to utilize the server service;

requesting the server device to start operating the common module at the server device, when a shortage of resources occurs at the client device due to a lowering of a processing capacity or an increase in work load during execution of the common module in the client device;

reporting updating of one of the delivered service modules, when the one service module is updated, to the address of the client device registered in the module delivery destination table; and acquiring the updated service module from the server device, when the client device receives the update report.

6. A computer-readable recording medium with a program recorded therein to make a computer execute a distributed processing method for a distributed processing system having at least one server device and at least one client device connected to each other through a network, said program comprising:

delivering an initial setting module from the server device in response to a request by the client device to acquire service modules, including a common module executable in both operating environments of the server device and the client device, required for using a distributed service program as a server service provided by the server device to the client device;

executing the acquired initial setting module in the client device and acquiring the required service modules of the distributed service program from the server device;

executing the acquired service modules, including the common module, of the distributed service program in the client device to utilize the server service; and requesting the server device to start operating the common module at the server device, when a shortage of resources occurs at the client device due to a lowering of a processing capacity or an increase in work load during execution of the common module in the client device.

7. A computer-readable recording medium with a program recorded therein to make a computer execute a distributed processing method for a distributed processing system having at least one server device and at least one client device connected to each other through a network, said program comprising:

delivering an initial setting module from the server device in response to a request by the client device to acquire service modules, including a common module executable in both operating environments of the server device and the client device, required for using a distributed service program as server service provided by the server device to the client device;

acquiring the required service modules of the distributed service program from the server device by executing the initial setting module in the client device;

registering in the server device, when the server device delivers the required service modules to the client device, an address of the client device as a delivery destination of the delivered service modules, in a module delivery destination table;

executing the acquired service modules of the distributed service program in the client device to utilize the server service;

requesting the server device to start operating the common module at the server device, when a shortage of resources occurs at the client device due to a lowering of a processing capacity or an increase in work load during execution of the common module in the client device;

reporting updating of one of the delivered service modules, when the one service module is updated, to the address of the client device registered in the module delivery destination table; and acquiring the updated service module from the server device, when the client device receives the update report.

8. A client device connected to a server device through a network for constructing a distributed processing system, said client device comprising:

a service utilizing unit executing an initial setting module to acquire service modules required for executing a distributed service program as a server service provided by the server device to the client device, acquiring a common module as a type of the service modules required for using the server service and the common module executable in both operating environments of said server device and said client device, checking a processing capacity of the client device or work load thereto, and selecting the service modules to be acquired from the server device from among the required service modules according to the checking, wherein the service utilizing unit further comprises a resource monitor periodically acquiring resource information regarding the processing capacity of said client device or work load thereto and requesting start of execution of said common module in said server device when the resource information indicates a shortage of resources due to a lowering of the processing capacity or an increase in the work load in said client device during execution of the common module.

9. The client device according to claim 8, comprising:

a module management table managing the service modules acquired from said server device, wherein said service utilizing unit acquires the service modules from said server device when the service modules required to use the server service have not been registered in said module management table, and registers the acquired service modules in said module management table.

10. The client device according to claim 8, wherein said service utilizing unit continues requesting execution of the common module in said server device until the shortage of resources in said client device is dissolved.

11. The client device according to claim 8, further comprising a module execution place table registering information regarding an execution place of said server device which executes said common module, wherein said service utilizing unit accesses said common module according to the information regarding the execution place registered in said module execution place table.

12. The client device according to claim 8, further comprising:

an updated module acquiring unit acquiring an updated service module from said server device upon receipt of update information regarding the acquired service modules from said server device.

* * * * *